(12) United States Patent
Lei et al.

(10) Patent No.: US 12,513,668 B2
(45) Date of Patent: *Dec. 30, 2025

(54) TECHNIQUES FOR USER EQUIPMENT (UE) PROCEDURES FOR RANDOM ACCESS CHANNEL (RACH) TYPE SELECTION AND RANDOM ACCESS RESPONSE (RAR) MONITORING IN A WIRELESS COMMUNICATION SYSTEM

(71) Applicant: QUALCOMM Incorporated, San Diego, CA (US)

(72) Inventors: Jing Lei, San Diego, CA (US); Muhammad Nazmul Islam, Littleton, MA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,932

(22) Filed: May 4, 2023

(65) Prior Publication Data

US 2023/0284284 A1 Sep. 7, 2023

Related U.S. Application Data

(63) Continuation of application No. 17/229,677, filed on Apr. 13, 2021, now Pat. No. 11,683,840.
(Continued)

(51) Int. Cl.
*H04W 74/0833* (2024.01)
*H04W 72/044* (2023.01)
(Continued)

(52) U.S. Cl.
CPC ..... *H04W 74/0833* (2013.01); *H04W 72/044* (2013.01); *H04W 72/1268* (2013.01); *H04W 74/0891* (2013.01)

(58) Field of Classification Search
None
See application file for complete search history.

(56) References Cited

U.S. PATENT DOCUMENTS

| 10,568,130 B2 | 2/2020 | Wang et al. |
| 2018/0110074 A1 | 4/2018 | Akkarakaran et al. |

(Continued)

FOREIGN PATENT DOCUMENTS

| CN | 110719650 A | 1/2020 |
| CN | 110769516 A | 2/2020 |

(Continued)

OTHER PUBLICATIONS

U.S. Appl. No. 62/882,565, filed Aug. 4, 2019, Murray et al., "Apparatus, System, Method, and Computer Program Product for Performing 2-Step RACH", paragraph 186.*
(Continued)

*Primary Examiner* — Gregory B Sefcheck
(74) *Attorney, Agent, or Firm* — Arent Fox, LLP

(57) ABSTRACT

The present disclosure relates to procedures for random access channel (RACH) type selection and random access response (RAR) monitoring. Specifically, the present disclosure may configure a user equipment (UE) and network entity to perform RACH type selections, determine mapping ratios, perform mapping procedures for orphan PRACH resources, monitor one or multiple RAR messages within an extended RAR window, and facilitate RAR type differentiation.

16 Claims, 14 Drawing Sheets

Related U.S. Application Data

(60) Provisional application No. 63/010,505, filed on Apr. 15, 2020.

(51) Int. Cl.
*H04W 72/1268* (2023.01)
*H04W 74/08* (2009.01)

(56) References Cited

U.S. PATENT DOCUMENTS

| | | |
|---|---|---|
| 2018/0279376 A1 | 9/2018 | Dinan et al. |
| 2020/0100297 A1 | 3/2020 | Agiwal et al. |
| 2020/0112994 A1 | 4/2020 | Zhang et al. |
| 2020/0267773 A1* | 8/2020 | Islam ............... H04W 74/0833 |
| 2020/0305202 A1 | 9/2020 | Zhang et al. |
| 2020/0314913 A1 | 10/2020 | Rastegardoost et al. |
| 2021/0045159 A1 | 2/2021 | Lei et al. |
| 2021/0051672 A1 | 2/2021 | Rastegardoost et al. |
| 2021/0051707 A1 | 2/2021 | Rastegardoost et al. |
| 2021/0100034 A1* | 4/2021 | Turtinen ............. H04B 17/318 |
| 2021/0112600 A1 | 4/2021 | Lei et al. |
| 2021/0126698 A1* | 4/2021 | Tsai ...................... H04B 7/088 |
| 2021/0136831 A1 | 5/2021 | Zhang et al. |
| 2021/0153259 A1 | 5/2021 | Wu et al. |
| 2021/0219349 A1* | 7/2021 | Huang ............. H04W 74/0833 |
| 2021/0227585 A1* | 7/2021 | Tsai ................... H04W 74/006 |
| 2021/0243814 A1 | 8/2021 | Zhang et al. |
| 2021/0274525 A1 | 9/2021 | Wei et al. |
| 2021/0315016 A1 | 10/2021 | Taherzadeh Boroujeni et al. |
| 2021/0329701 A1 | 10/2021 | Lei |
| 2021/0329703 A1 | 10/2021 | Yang et al. |
| 2021/0329704 A1 | 10/2021 | Yang et al. |
| 2021/0378031 A1 | 12/2021 | Chai et al. |
| 2021/0410182 A1 | 12/2021 | Zhang et al. |
| 2022/0070938 A1 | 3/2022 | Wu et al. |
| 2022/0110170 A1* | 4/2022 | Shi .................... H04W 74/0866 |
| 2022/0132595 A1 | 4/2022 | Ko et al. |
| 2022/0150956 A1 | 5/2022 | Xiong et al. |
| 2022/0150980 A1* | 5/2022 | Christoffersson ..... H04W 72/23 |
| 2022/0150982 A1 | 5/2022 | Lee et al. |
| 2022/0159739 A1 | 5/2022 | Takeda et al. |
| 2022/0159740 A1 | 5/2022 | Xiong et al. |
| 2022/0159741 A1 | 5/2022 | Hoang et al. |
| 2022/0174744 A1 | 6/2022 | Lin et al. |
| 2022/0174750 A1 | 6/2022 | Ohara |
| 2022/0191937 A1 | 6/2022 | Lei et al. |
| 2022/0191945 A1 | 6/2022 | Yamamoto et al. |
| 2022/0210842 A1* | 6/2022 | Lei ....................... H04L 5/0051 |
| 2022/0240324 A1* | 7/2022 | Ko ......................... H04W 76/28 |
| 2022/0240326 A1* | 7/2022 | Rune ................... H04W 56/001 |
| 2022/0240327 A1* | 7/2022 | Ko ......................... H04W 74/08 |
| 2022/0272760 A1* | 8/2022 | Murray ............ H04W 74/0833 |
| 2022/0369373 A1* | 11/2022 | Enbuske ........... H04W 74/0833 |
| 2022/0394757 A1 | 12/2022 | Wang |
| 2023/0083993 A1* | 3/2023 | Rune ................. H04W 74/0833 370/329 |
| 2023/0164773 A1* | 5/2023 | Alfarhan ............... H04W 72/52 370/329 |
| 2024/0049289 A1* | 2/2024 | Ko ....................... H04W 74/004 |

FOREIGN PATENT DOCUMENTS

| | | |
|---|---|---|
| WO | 2018075256 A1 | 4/2018 |
| WO | 2018118218 A1 | 6/2018 |
| WO | 2020032742 A1 | 2/2020 |
| WO | 2020032745 A1 | 2/2020 |

OTHER PUBLICATIONS

CMCC: "Further Discussion on RA Type Selection", 3GPP Draft, 3GPP TSG-RAN WG2 Meeting #107bis, R2-1912954 Further Discussion on RA Type Selection, 3rd Generation Partnership Project (3GPP), Mobile Competence Centre; 650, Route Des Lucioles; F-06921 Sophia-Antipolis Cedex; France, vol. RAN WG2, No. Chongqing; Oct. 14, 2019-Oct. 18, 2019, Oct. 4, 2019 (Oct. 4, 2019), 2 Pages, XP051804752, "2 Discussion"—"3 Conclusion", the whole document.

International Preliminary Report on Patentability—PCT/US2021/027339—The International Bureau of WIPO—Geneva, Switzerland—Oct. 27, 2022.

International Search Report and Written Opinion—PCT/US2021/027339—ISA/EPO—Aug. 13, 2021.

Panasonic: "Discussion on the RACH Type Selection," 3GPP Draft, 3GPP TSG-RAN WG2 Meeting#107, R2-1909238, Discussion on the RACH Type Selection, 3rd Generation Partnership Project (3GPP), Mobile Competence Centre, 650, Route Des Lucioles, F-06921, Sophia-Antipolis Cedex, France, vol. RAN WG2, No. Prague, Czech Republic; Aug. 26, 2019-Aug. 30, 2019, Aug. 15, 2019 (Aug. 15, 2019), XP051767045, 3 pages, "1 Introduction".

U.S. Appl. No. 62/843,276 to Xiong et al., filed May 3, 2019, "System and Methods on the Mapping Between PRACH Preamble and PUSCH Resource Unit for 2-Step RACH", corresponding to citations from PGPub 20220159740.

U.S. Appl. No. 62/846,496 to Xiong et al., filed May 10, 2019, "System and Methods on the Mapping Between PRACH Preamble and PUSCH Resource Unit for 2-Step RACH", corresponding to citations from PGPub 20220159740.

U.S. Appl. No. 63/005,053 to Taherzadeh Boroujeni et al., filed Apr. 3, 2020, "Alternative Two-Step RACH Procedure", Fig.4 and corresponding disclosure corresponding to citations from PGPub 20210315016.

ZTE, et al., "Considerations on the Channel Structure of msgA", 3GPP draft, 3GPP TSG RAN WG1 Meeting #96,R1-1901626 Considerations on the Channel Structure of MSGA, 3rd Generation Partnership Project (3GPP), Mobile Competence Centre, 650, Route Des Lucioles, F-06921 Sophia-Antipolis Cedex, vol. RAN WG1, No. Athens, Greece, Feb. 25, 2019-Mar. 1, 2019, Feb. 16, 2019 (Feb. 16, 2019), XP051599323, 5 Pages, Section 2.1, "2.2 Resource mapping in one PUSCH occasion"—"3 Conclusion".

* cited by examiner

TECHNIQUES FOR USER EQUIPMENT (UE) PROCEDURES FOR RANDOM ACCESS CHANNEL (RACH) TYPE SELECTION AND RANDOM ACCESS RESPONSE (RAR) MONITORING IN A WIRELESS COMMUNICATION SYSTEM

CLAIM OF PRIORITY UNDER 35 U.S.C. § 119

This Patent Application is a continuation of U.S. Non-Provisional Application Ser. No.: 17/229,677, entitled "TECHNIQUES FOR USER EQUIPMENT (UE) PROCEDURES FOR RANDOM ACCESS CHANNEL (RACH) TYPE SELECTION AND RANDOM ACCESS RESPONSE (RAR) MONITORING IN A WIRELESS COMMUNICATION SYSTEM" filed on Apr. 13, 2021, and issued as U.S. Pat. No. 11,683,840, which claims the benefit of U.S. Provisional Patent Application No. 63/010,505, entitled "TECHNIQUES FOR USER EQUIPMENT (UE) PROCEDURES FOR RANDOM ACCESS CHANNEL (RACH) TYPE SELECTION AND RANDOM ACCESS RESPONSE (RAR) MONITORING IN A WIRELESS COMMUNICATION SYSTEM" and filed on Apr. 15, 2020, which are expressly incorporated by reference herein in their entirety.

BACKGROUND

Aspects of the present disclosure relate generally to wireless communication systems, and more particularly, to user equipment (UE) procedures for random access channel (RACH) type selection and random access response (RAR) monitoring.

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some aspects may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication at a user equipment (UE) including receiving an allocation of resources, a set of criteria for a random access channel (RACH) type selection, and a reference signal received power (RSRP) measurement object for at least one of a two-step RACH procedure or a four-step RACH procedure from a network entity associated with one or multiple types of UE capabilities and one or multiple targets of latency or coverage enhancement, performing an RSRP measurement according to the RSRP measurement object, performing the RACH type selection based on a UE capability, a target of coverage or latency enhancement, and the set of criteria indicated by the network entity in system information (SI) or radio resource control (RRC) signaling, and performing one of the two-step RACH procedure of the four-step RACH procedure using the allocated resources associated with a UE capability and a target of coverage or latency requirement.

Another aspect of the subject matter described in this disclosure can be implemented in an apparatus for wireless communication. The apparatus may include memory including instructions and a processor in communication with the memory to execute the instructions to receive an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement, perform an RSRP measurement according to the RSRP measurement object, performing the RACH type selection based on a UE capability, a target of coverage or latency enhancement, and the set of criteria indicated by the network entity in SI or RRC signaling, and perform one of the two-step RACH procedure of the four-step RACH procedure using the allocated resources associated with a UE capability and a target of coverage or latency requirement.

A further aspect of the subject matter described in this disclosure can be implemented in an apparatus for wireless communication. The apparatus may include means for receiving an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement, means for performing an RSRP measurement according to the RSRP measurement object, means for performing the RACH type selection based on a UE capability, a target of coverage or latency enhancement, and the set of criteria indicated by the network entity in SI or RRC signaling, and means for performing one of the two-step RACH procedure of the four-step RACH procedure using the allocated resources associated with a UE capability and a target of coverage or latency requirement.

Another aspect of the subject matter described in this disclosure can be implemented in a non-transitory computer-readable medium including stored instructions of communications, executable by a processor to receive an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement, perform an RSRP measurement according to the RSRP measurement object, perform the RACH type selection based on a UE capability, a target of coverage or latency enhancement, and the set of criteria indicated by the network entity in SI or RRC signaling, and perform one of the two-step RACH procedure of the four-step RACH procedure using the allocated resources associated with a UE capability and a target of coverage or latency requirement.

Another example aspect includes a method of wireless communication at a network entity including determining an allocation of resources for at least one of a two-step RACH procedure or a four-step RACH procedure for a UE capability type or a target of coverage or latency enhancement, transmitting a set of criteria for RACH type selection for the UE capability type or a target of coverage or latency enhancement, transmitting a RSRP measurement object for the UE capability type or a target of coverage or latency enhancement, and transmitting a message indicating the allocation of resources to the UE.

Another aspect of the subject matter described in this disclosure can be implemented in an apparatus for wireless communication. The apparatus may include memory including instructions and a processor in communication with the memory to execute the instructions to determine an allocation of resources for at least one of a two-step RACH procedure or a four-step RACH procedure for a UE capability type or a target of coverage or latency enhancement, transmit a set of criteria for RACH type selection for the UE capability type or a target of coverage or latency enhancement, transmit a RSRP measurement object for the UE capability type or a target of coverage or latency enhancement, and transmitting a message indicating the allocation of resources to the UE.

A further aspect of the subject matter described in this disclosure can be implemented in an apparatus for wireless communication. The apparatus may include means for determining an allocation of resources for at least one of a two-step RACH procedure or a four-step RACH procedure for a UE capability type or a target of coverage or latency enhancement, means for transmitting a set of criteria for RACH type selection for the UE capability type or a target of coverage or latency enhancement, means for transmitting a RSRP measurement object for the UE capability type or a target of coverage or latency enhancement, and transmitting a message indicating the allocation of resources to the UE.

Another aspect of the subject matter described in this disclosure can be implemented in a non-transitory computer-readable medium including stored instructions of communications, executable by a processor to determine an allocation of resources for at least one of a two-step RACH procedure or a four-step RACH procedure for a UE capability type or a target of coverage or latency enhancement, transmit a set of criteria for RACH type selection for the UE capability type or a target of coverage or latency enhancement, transmitting a RSRP measurement object for the UE capability type or a target of coverage or latency enhancement, and transmit a message indicating the allocation of resources to the UE.

An example aspect includes a method of wireless communication at an apparatus of a UE including receiving an allocation of a physical uplink shared channel (PUSCH) resource unit (PRU) resource set including multiple PRUs from a network entity, receiving a set of criteria for a RACH type selection and a RSRP measurement object for at least one of a two-step RACH procedure or a four-step RACH procedure, selecting the two-step RACH procedure based at least on a UE capability type, an RSRP measurement or a target for coverage enhancement, determining a mapping ratio for a message A preamble and the PRU resource set, and performing a message A transmission as part of a two-step RACH procedure based at least on the determined mapping ratio.

Another aspect of the subject matter described in this disclosure can be implemented in an apparatus for wireless communication. The apparatus may include memory including instructions and a processor in communication with the memory to execute the instructions to receive an allocation of a PRU resource set including multiple PRUs from a network entity, receive a set of criteria for a RACH type selection and a RSRP measurement object for at least one of a two-step RACH procedure or a four-step RACH procedure, select the two-step RACH procedure based at least on a UE capability type, an RSRP measurement or a target for coverage enhancement, determine a mapping ratio for a message A preamble and the PRU resource set, and perform a message A transmission as part of a two-step RACH procedure based at least on the determined mapping ratio.

A further aspect of the subject matter described in this disclosure can be implemented in an apparatus for wireless communication. The apparatus may include means for receiving an allocation of a PRU resource set including multiple PRUs from a network entity, means for receiving a set of criteria for a RACH type selection and a RSRP measurement object for at least one of a two-step RACH procedure or a four-step RACH procedure, means for selecting the two-step RACH procedure based at least on a UE capability type, an RSRP measurement or a target for coverage enhancement, means for determining a mapping ratio for a message A preamble and the PRU resource set, and means for performing a message A transmission as part of a two-step RACH procedure based at least on the determined mapping ratio.

Another aspect of the subject matter described in this disclosure can be implemented in a non-transitory computer-readable medium including stored instructions of communications, executable by a processor to receive an allocation of a PRU resource set including multiple PRUs from a network entity, receive a set of criteria for a RACH type selection and a RSRP measurement object for at least one of a two-step RACH procedure or a four-step RACH procedure, select the two-step RACH procedure based at least on a UE capability type, an RSRP measurement or a target for coverage enhancement, determine a mapping ratio for a message A preamble and the PRU resource set, and perform a message A transmission as part of a two-step RACH procedure based at least on the determined mapping ratio.

Another example aspect includes a method of wireless communication at a network entity including determining an allocation of a PRU resource set including multiple PRUs for a UE, determining a mapping ratio for a message A preamble and the PRU resource set, and transmitting the mapping ratio to the UE.

Another aspect of the subject matter described in this disclosure can be implemented in an apparatus for wireless communication. The apparatus may include memory including instructions and a processor in communication with the memory to execute the instructions to determine an allocation of a PRU resource set including multiple PRUs for a UE, determine a mapping ratio for a message A preamble and the PRU resource set, and transmit the mapping ratio to the UE.

A further aspect of the subject matter described in this disclosure can be implemented in an apparatus for wireless communication. The apparatus may include means for determining an allocation of a PRU resource set including multiple PRUs for a UE, means for determining a mapping ratio for a message A preamble and the PRU resource set, and means for transmitting the mapping ratio to the UE.

Another aspect of the subject matter described in this disclosure can be implemented in a non-transitory computer-readable medium including stored instructions of communications, executable by a processor to determine an allocation of a PRU resource set including multiple PRUs for a UE, determine a mapping ratio for a message A preamble and the PRU resource set, and transmit the mapping ratio to the UE.

An example aspect includes a method of wireless communication at a UE including receiving an allocation of a preamble group associated with a RACH occasion (RO) from a network entity, wherein a different type of UE capability or a target of coverage or latency enhancement associated with a different preamble group shares the RO, and receiving a random access response (RAR) message as part of a RACH procedure according to a RAR distinguishing parameter.

Another aspect of the subject matter described in this disclosure can be implemented in an apparatus for wireless communication. The apparatus may include memory including instructions and a processor in communication with the memory to execute the instructions to receive an allocation of a preamble group associated with a RO from a network entity, wherein a different type of UE capability or a target of coverage or latency enhancement associated with a different preamble group shares the RO, and receive a RAR message as part of a RACH procedure according to a RAR distinguishing parameter.

A further aspect of the subject matter described in this disclosure can be implemented in an apparatus for wireless communication. The apparatus may include means for receiving an allocation of a preamble group associated with a RO from a network entity, wherein a different type of UE capability or a target of coverage or latency enhancement associated with a different preamble group shares the RO, and means for receiving a RAR message as part of a RACH procedure according to a RAR distinguishing parameter.

Another aspect of the subject matter described in this disclosure can be implemented in a non-transitory computer-readable medium including stored instructions of communications, executable by a processor to receive an allocation of a preamble group associated with a RO from a network entity, wherein a different type of UE capability or a target of coverage or latency enhancement associated with a different preamble group shares the RO, and receive a RAR message as part of a RACH procedure according to a RAR distinguishing parameter.

Another example aspect includes a method of wireless communication at a network entity including determining that a first UE and a second UE share similar RO, allocating the first UE and the second UE with different preamble groups of the similar RO based on determining that the first UE and the second UE share similar communication characteristics, and transmitting a RAR as part of a RACH procedure to one or both of the first UE and the second UE according to a RAR distinguishing parameter.

Another aspect of the subject matter described in this disclosure can be implemented in an apparatus for wireless communication. The apparatus may include memory including instructions and a processor in communication with the memory to execute the instructions to determine that a first UE and a second UE share similar RO, allocate the first UE and the second UE with different preamble groups of the similar RO based on determining that the first UE and the second UE share similar communication characteristics, and transmit a RAR as part of a RACH procedure to one or both of the first UE and the second UE according to a RAR distinguishing parameter.

A further aspect of the subject matter described in this disclosure can be implemented in an apparatus for wireless communication. The apparatus may include means for determining that a first UE and a second UE share similar RO, means for allocating the first UE and the second UE with different preamble groups of the similar RO based on determining that the first UE and the second UE share similar communication characteristics, and means for transmitting a RAR as part of a RACH procedure to one or both of the first UE and the second UE according to a RAR distinguishing parameter.

Another aspect of the subject matter described in this disclosure can be implemented in a non-transitory computer-readable medium including stored instructions of communications, executable by a processor to determine that a first UE and a second UE share similar RO, allocate the first UE and the second UE with different preamble groups of the similar RO based on determining that the first UE and the second UE share similar communication characteristics, and transmit a RAR as part of a RACH procedure to one or both of the first UE and the second UE according to a RAR distinguishing parameter.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
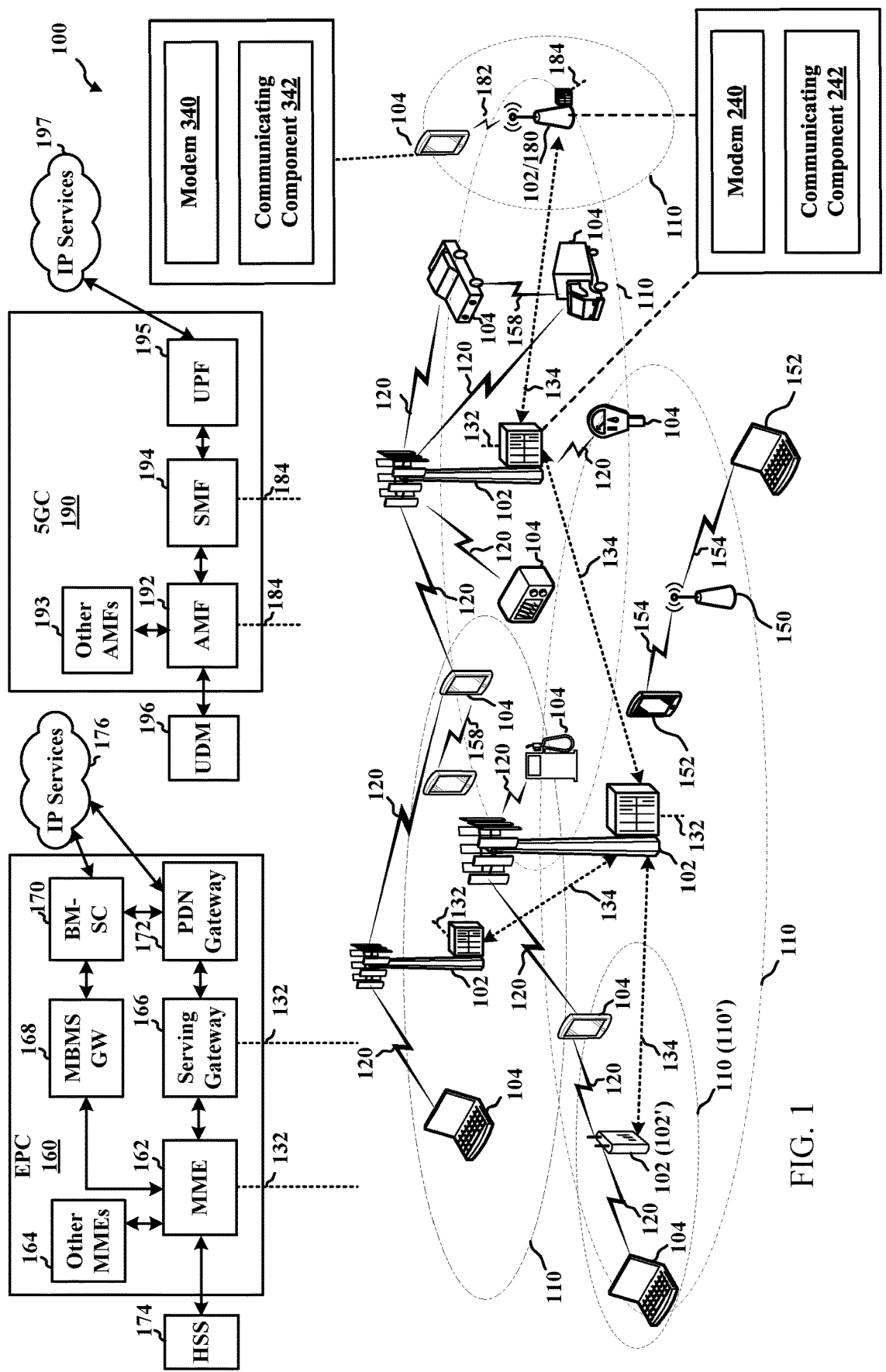
FIG. 1 illustrates an example of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to a user equipment (UE) procedures for random access channel (RACH) type selection, RACH resource configuration and random access response (RAR) monitoring associated with different types of UE capabilities and different targets of coverage/latency enhancement.

For a UE to initiate a two-step RACH procedure, the UE may have a valid PRACH resource (e.g., for message A (msgA) preamble transmission), which can be mapped to a valid physical uplink shared channel (PUSCH) resource unit (PRU) (e.g., for msgA payload transmission). The resource configurations and a mapping rule for msgA preamble and/or payload transmission may be determined by the network for one or multiple types of UE capabilities and one or multiple targets of coverage/latency enhancement, which may be indicated to the UE in system information (SI) or radio resource control (RRC) signaling. The UE may validate the network-configured physical RACH (PRACH) and PUSCH resources first, before determining a mapping ratio between validated PRACH and PUSCH resources. However, enhancements of RACH procedures would be beneficial to support user plane (UP) data transmissions in an RRC IDLE/INACTIVE state, coverage enhancements for uplink and downlink transmissions during RACH procedures, and co-existence of different UE capabilities. As such, enhancements of UE procedures for RACH type selection and random access response (RAR) monitoring to support different UE capabilities and requirements for coverage and/or latency are set forth herein.

Specifically, in an aspect, the present disclosure provides criteria for RACH type selection between the four-step RACH procedure and the two-step RACH procedure. Resources for four-step RACH and two-step RACH may be configured for UEs with different capabilities. For example, RACH type selection can be based at least on reference signal received power (RSRP) measurements, UE capabilities, and/or outcome of physical RACH (PRACH) and PUSCH resource validation for msgA. To perform two-step RACH, different RSRP thresholds may be configured for a reduced capability (RedCap) UE and ordinary or Non-RedCap UE, or a UE with different coverage and/or latency requirements. A RedCap UE may be a UE having any one or more of a reduced bandwidth, reduced number of antennas, reduced cost/complexity, reduced transmission power and/or relaxed requirements for processing capability and timeline. Some examples of RedCap UEs may include smart wearables (watch, medical devices, etc.), industry sensors, and/or video surveillance cameras. The RACH resource configurations, RACH type selection, power control parameters and prioritization rules may be separately configured for the RedCap UE and ordinary UE.

In a further aspect, the present disclosure provides a determination of a mapping ratio between a number of valid PRACH resources and a number of valid PUSCH resources. For a RedCap UE or a UE pursuing coverage enhancement, a PRU resource set including multiple PRUs may be allocated per msgA payload transmission. In an aspect, the multiple PRUs may be aggregated PUSCH slots with Type A or B mapping. Further, the PRU resource set may span multiple slots in a time domain. Additionally, inter-slot or intra-slot frequency hopping can be configured for the PRU resource set. To validate the resources for a PRU resource set including multiple PRUs, the validation of PUSCH occasions (POs) for msgA of a two-step RACH may be performed based on joint validation of POs associated with PRU resource sets, or a separate validation of POs. Moreover, a UE may determine the mapping ratio for a msgA preamble and the PRU resource set. In one example, a network entity (e.g., a base station such as a gNB) may transmit the mapping ratio in SI or an RRC message for a given msgA configuration, and the UE may decode the SI or the RRC message to obtain the mapping ratio. In another example, the UE may derive the mapping ratio 'K' after PRACH and PUSCH resource validation for a given msgA configuration, based on the below formula where number of PRUs per PRU resource set >1.

$$K = \text{floor}\left(\frac{\text{number of valid } PRACH \text{ resources}}{\text{number of valid } PRU \text{ resource sets} \times \text{number of } PRUs \text{ per } PRU \text{ resource set}}\right)$$

In an additional aspect, the present disclosure provides mapping procedures for orphan PRACH resources. For example, orphan PRACH resources may refer to a set of valid PRACH resources that cannot be mapped to a set of valid PUSCH resources within a msgA PRACH mapping cycle, where the mapping cycle can be a PRACH slot. Although the orphan PRACH resources cannot be used for msgA (e.g., PRACH and payload) transmission, they can still be used for PRACH only transmission. Further, for a four-step RACH procedure, msg1 may be a PRACH only transmission.

Specifically, the mapping ratio between a validated preamble and validated PRU resource sets may be an integer, and in some cases, there may be a set of "orphan" preambles or PRU resources that are not used for two-step RACH, such that:

$$K < \frac{\text{number of valid } PRACH \text{ resources}}{\text{number of valid } PRU \text{ resource sets} \times \text{number of } PRUs \text{ per } PRU \text{ resource set}} < K + 1$$

To improve the utilization efficiency of PRACH, a base station may transmit the index of the RACH occasion (RO) with "orphan" PRACH resources for each PRACH slot within a synchronization signal block (SSB)-to-RO association pattern period or channel state indication reference signal (CSI-RS)-to-RO association pattern period. If the UE has determined to use two-step procedures for random access and selected a valid RO without "orphan" PRACH resources, the UE may ignore the orphan PRACH resources. However, if the UE has not determined the RACH type yet, and the UE can decode the configuration and/or mapping information for both two-step RACH and four-step RACH procedures, the UE can use the orphan PRACH resource to transmit msg1 of a four-step RACH procedure, and monitor msg2, or both msg2 and msgB, wherein the RAR messages for UEs which have selected different types of RACH procedure but are sharing the same RO can be multiplexed by the base station in msgB. In particular, in this aspect a msg2 physical downlink control channel (PDCCH) may be addressed to a random access radio network identifier (RA-RNTI) or a C-RNTI, and the starting point of a msg2 RAR window may be aligned with an earliest synchronization signal (SS) after msg1/PRACH transmission. In this case, if the UE can decode msg2 PDCCH, the UE may receive a RAR grant and timing advance (TA) in a msg2 PDSCH for a msg3 transmission.

Another aspect may be where a msgB PDCCH is addressed to a msgB-RNTI or C-RNTI, and the starting point of a msgB RAR window may be aligned with an earliest SS after the PRU resource set transmission. In this case, if the UE can decode a msgB PDCCH, the UE may receive a FallbackRAR and TA in msgB PDSCH. In yet another aspect, the present disclosure provides RAR type differentiation. Specifically, if UEs with different capabilities or coverage and/or latency requirements share the same RO, they may be allocated with different preamble groups. To differentiate a RAR of UEs selecting different preamble groups of the same RO, a number of aspects may be implemented. In one aspect, a different RNTI formulation may be used to mask the PDCCH scheduling RAR. In another aspect, the RAR type may be indicated by re-purposing the reserved bits of downlink control information (DCI). In a further aspect, different SS sets may be allocated in the same or different bandwidth part (BWP). In yet another aspect, different demodulation reference signal (DMRS) resources may be configured for PDCCH.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for performing RACH type selections, determining mapping ratios, performing mapping procedures for orphan PRACH resources, and facilitating RAR type differentiation, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for performing RACH type selections, determining mapping ratios, performing mapping procedures for orphan PRACH resources, and facilitating RAR type differentiation, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110.

For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-7, aspects are depicted with reference to one or more components and one or more methods that may perform the actions or operations described herein, where aspects in dashed line may be optional. Although the operations described below in FIGS. 5A-5C and 6A-6C are presented in a particular order or as being performed by an example component, it should be understood that the ordering of the actions and the components performing the actions may be varied, depending on the aspect. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
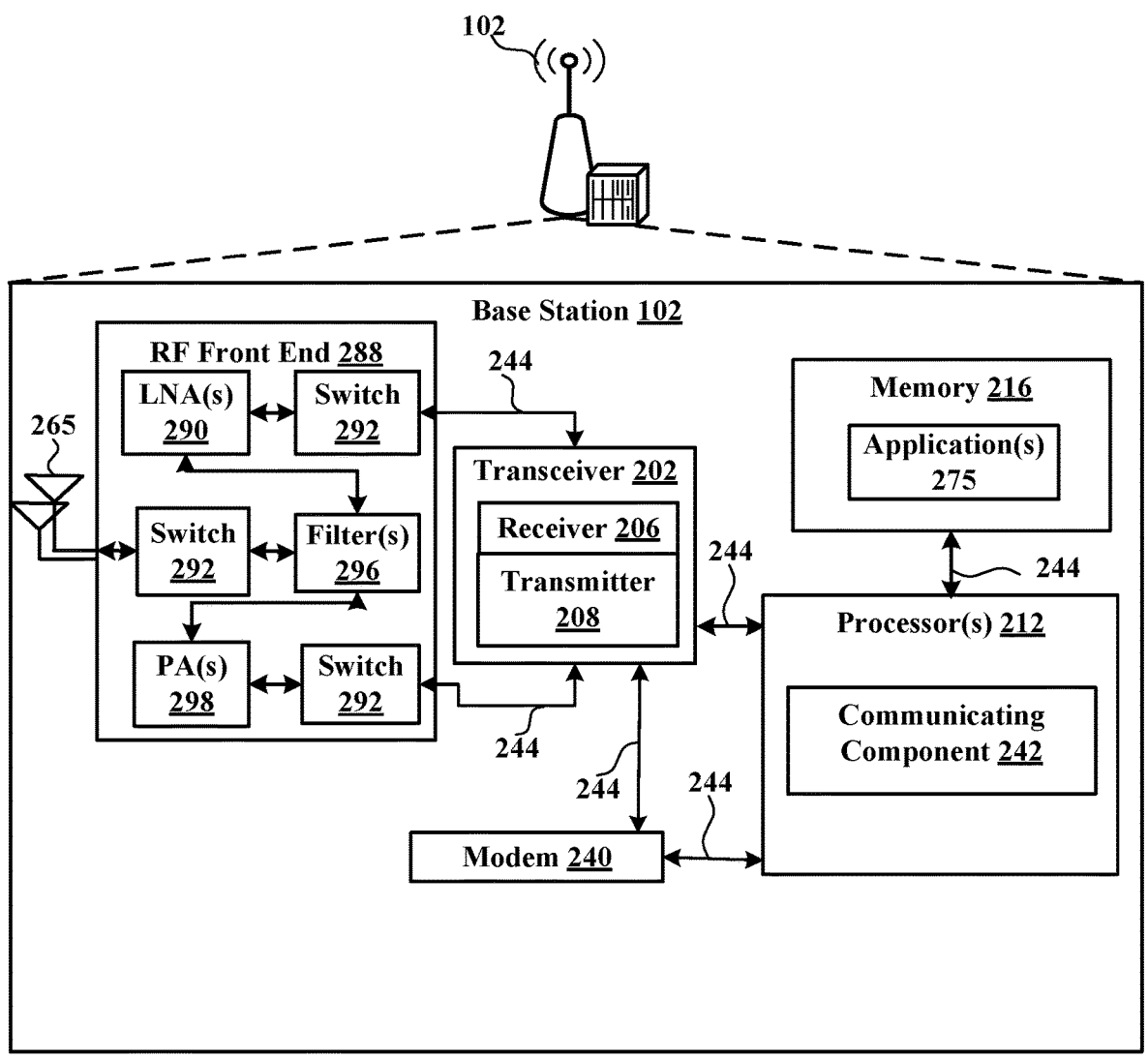
FIG. 2 is a block diagram illustrating an example of a network entity (also referred to as a base station).

FIG. 2 is a block diagram illustrating an example of a network entity (also referred to as a base station). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for performing RACH type selections, determining mapping ratios, performing mapping procedures for orphan PRACH resources, and facilitating RAR type differentiation.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RS SI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
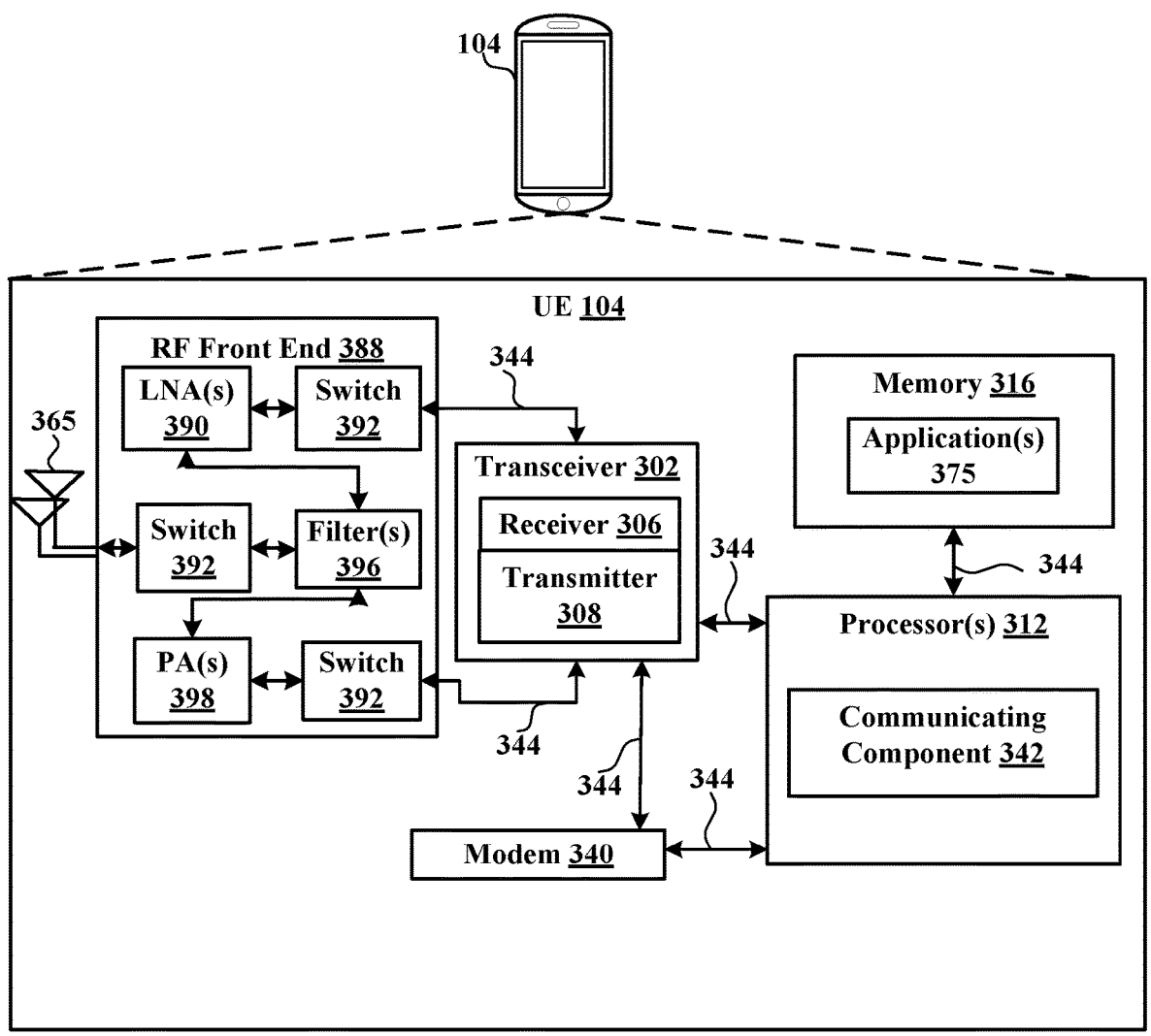
FIG. 3 is a block diagram illustrating an example of a user equipment (UE).

FIG. 3 is a block diagram illustrating an example of a user equipment (UE) 104. The UE 104 may include a variety of components, some of which have already been described above and are described further herein, including components such as one or more processors 312 and memory 316 and transceiver 302 in communication via one or more buses 344, which may operate in conjunction with modem 340 and communication component 342 for performing RACH type selections, determining mapping ratios, performing mapping procedures for orphan PRACH resources, and facilitating RAR type differentiation.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In some aspects, the processor(s) 312 may correspond to one or more of the processors described in connection with the base station in FIG. 7. Similarly, the memory 316 may correspond to the memory described in connection with the base station in FIG. 7.

Figure 4A:
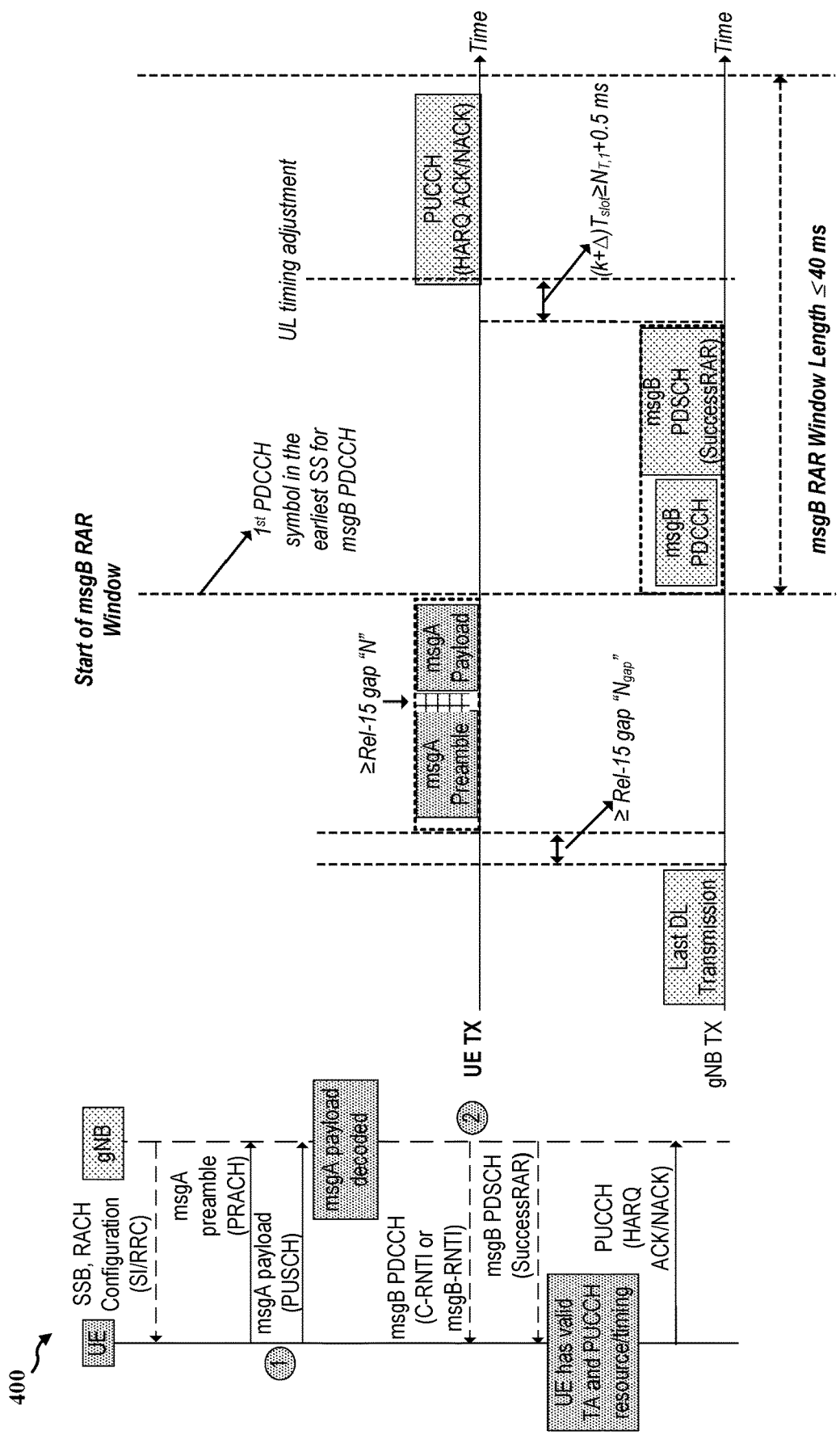
FIG. 4A is an example flow diagram of a hybrid automatic repeat request (HARQ) feedback to message B physical downlink shared channel (PDSCH).

FIG. 4A is an example flow diagram of a hybrid automatic repeat request (HARQ) feedback to message B PDSCH 400 according to a two-step RACH procedure. The UE may initially receive an SSB and RACH configuration information via SI or RRC messaging from a gNB (e.g., network entity), where the CSI-RS based RACH resource configuration can also be included in an SI or RRC messaging. The UE may then transmit a msgA preamble via PRACH, and may then transmit a msgA payload via PUSCH. The msgA payload may be decoded at or by the gNB.

Subsequently, the gNB may transmit a msgB PDCCH associated with a cell RNTI (C-RNTI) or msgB-RNTI. The gNB may then transmit msgB PDSCH including a SuccessRAR indication. The UE may determine a valid TA and PUCCH resource and/or timing. As a result, the UE may transmit a PUCCH transmission including a hybrid automatic repeat request (HARQ) acknowledgement (ACK) or negative ACK (HACK).

Figure 4B:
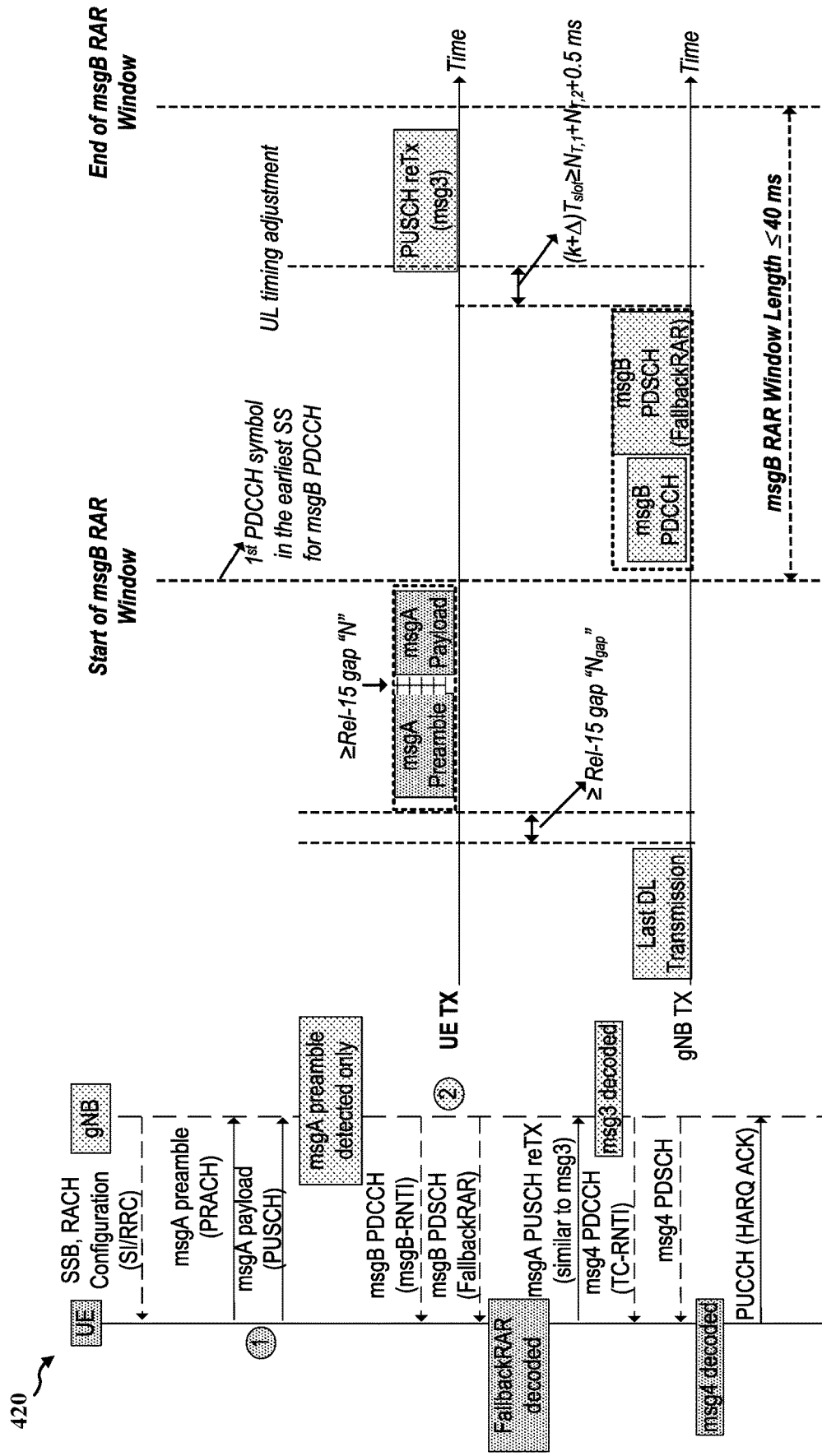
FIG. 4B is an example flow diagram of a message 3 fallback based on fallback random access request (RAR).

FIG. 4B is an example flow diagram of a message 3 fallback based on fallback RAR 420 according to a two-step RACH procedure with a four-step RACH fallback. The UE may initially receive an SSB and RACH configuration information via SI or RRC messaging from a gNB, where the CSI-RS based RACH resource configuration can also be included in an SI or RRC messaging. The UE may then transmit a msgA preamble via PRACH, and may subsequently transmit a msgA payload via PUSCH. The gNB may only detect the msgA preamble and not the msgA payload. Subsequently, the gNB may transmit a msgB PDCCH associated with a msgB-RNTI.

The gNB may follow up with msgB PDSCH corresponding to a FalbackRAR. The UE may decode the FallbackRAR and retransmit the msgA PUSCH (e.g., similar to msg3). The gNB may decode the msg3 and transmit a msg4 PDCCH including a temporary cell RNTI (TC-RNTI), followed by a msg4 PDSCH transmission. The msg4 may be decoded by the UE and a HARQ ACK may be transmitted via PUCCH if successfully decoded.

Figure 4C:
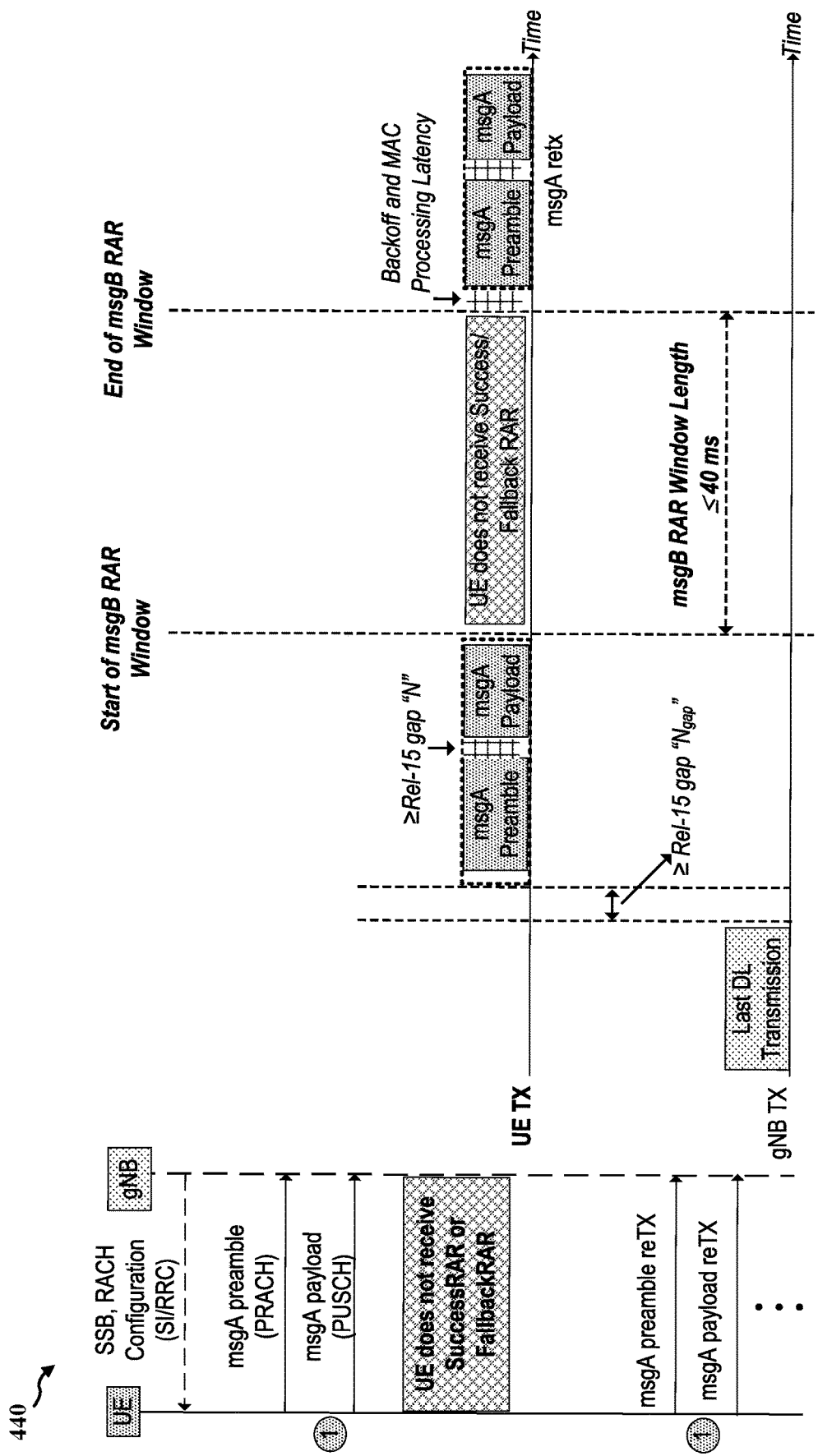
FIG. 4C is an example flow diagram of a message A retransmission.

FIG. 4C is an example flow diagram of a message A retransmission 440 according to a two-step RACH procedure. The UE may initially receive an SSB and RACH configuration information via SI or RRC messaging from a gNB. The UE may then transmit a msgA preamble via PRACH, and may subsequently transmit a msgA payload transmission via PUSCH. The UE may not receive a SuccessRAR or FallbackRAR from the gNB. Based on such determination, the UE may retransmit the msgA preamble and msgA payload to the gNB.

Figure 4D:
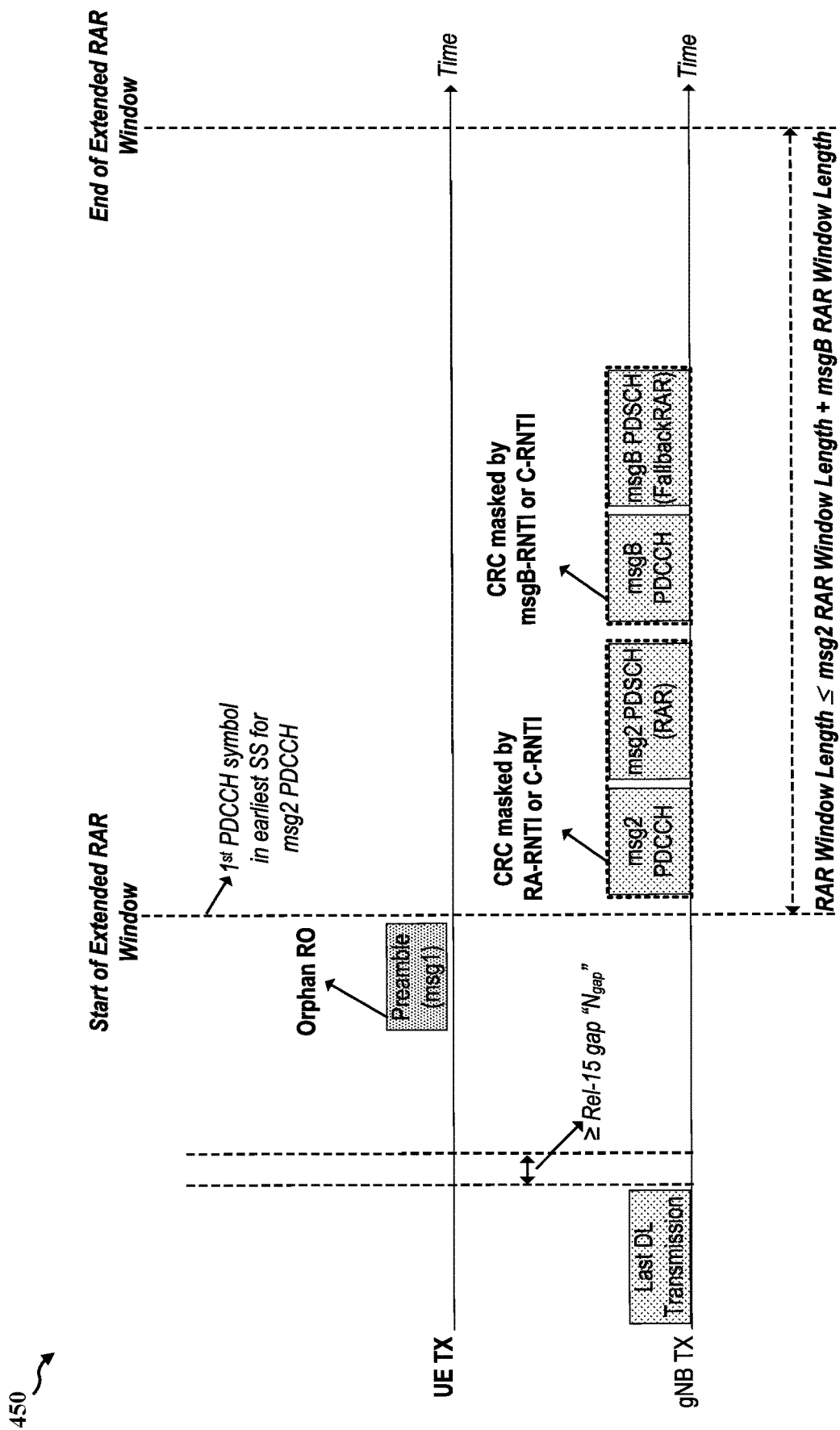
FIG. 4D is an example representation of an orphan PRACH Occasion (RO), physical random access channel (PRACH)-only transmission and extended RAR window.

FIG. 4D is an example representation of an orphan PRACH Occasion (RO), physical random access channel (PRACH)-only transmission and extended RAR window 450. Specifically, the UE may not find a valid PUSCH resource and can transmit PRACH only in some aspects. For example, the RAR window of msg2 may start after the PRACH. An orphan RO may be detected prior to the extended RAR window.

Figure 5A:
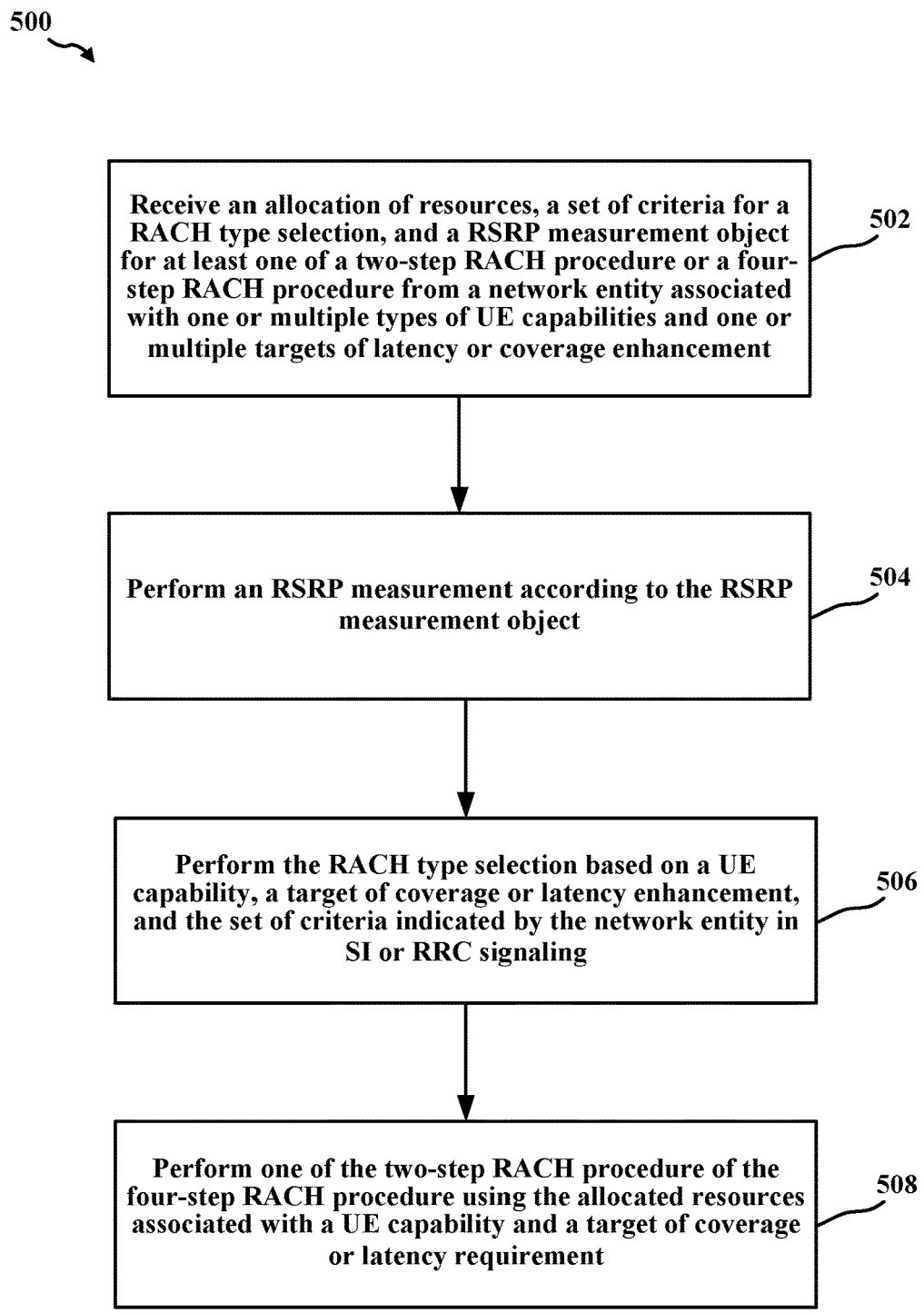
FIG. 5A is a flowchart of an example method of wireless communication at a UE.

FIG. 5A is a flowchart of an example method 500 of wireless communication at an apparatus of a UE. In an example, a UE 104 can perform the functions described in method 500 using one or more of the components described in FIGS. 1, 3 and 7.

At block 502, the method 500 may receive an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement. In some aspects, the communicating component 342, such as in conjunction with processor(s) 312, memory 316, or transceiver 302, may be configured to receive an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement. Thus, the UE 104, the processor(s) 312, the communicating component 342 or any subcomponent thereof may define the means for receiving an allocation of resources, a set of criteria for a RACH type selection, and a RSRP measurement object for at least one of a two-step RACH procedure or a four-step RACH procedure from a network entity associated with one or multiple types of UE capabilities and one or multiple targets of latency or coverage enhancement. For example, the processor 312 of the UE 104 may activate the transceiver 302 and associated RF front end 388 components to receive, from the network entity, allocation of resources, a set of criteria for a RACH type selection, and a RSRP measurement object.

In some aspects, the criteria for RACH type selection may include at least one of a filtered RSRP measurement, UE capability information, or a result of PRACH or PUSCH resource validation for message A.

In some aspects, the RSRP measurement object may include at least one of a time and frequency resource allocation for a reference signal, a periodicity of the reference signal, a filtering parameter of the RSRP measurement, or a threshold of the filtered RSRP measurement.

At block 504, the method 500 may perform an RSRP measurement according to the RSRP measurement object. In some aspects, the communicating component 342, such as in conjunction with processor(s) 312, memory 316, or transceiver 302, may be configured to perform an RSRP measurement according to the RSRP measurement object. Thus, the UE 104, the processor(s) 312, the communicating component 342 or one of its subcomponents may define the means for performing an RSRP measurement according to the RSRP measurement object. For example, the processor 312 of the UE 104 may activate the transceiver 302 and associated RF front end 388 components to measure the RSRP on at least one communication channel according to the RSRP measurement object by performing a linear average over the power contributions of resource elements that carry cell-specific reference signals within a measurement frequency bandwidth.

At block 506, the method 500 may perform the RACH type selection based on a UE capability, a target of coverage or latency enhancement, and the set of criteria indicated by the network entity in SI or RRC signaling. In some aspects, the communicating component 342, such as in conjunction with processor(s) 312, memory 316, or transceiver 302, may be configured to perform the RACH type selection based on a UE capability, a target of coverage or latency enhancement, and the set of criteria indicated by the network entity in SI or RRC signaling. Thus, the UE 104, the processor(s) 312, the communicating component 342 or one of its subcomponents may define the means for performing the RACH type selection based on a UE capability, a target of coverage or latency enhancement, and the set of criteria indicated by the network entity in SI or RRC signaling. For instance, the processor 312 of the UE 104 may, in conjunction with one or more applications 375 residing at the memory 316, may select a two-step RACH procedure or four-step RACH procedure based on a UE capability, a target of coverage or latency enhancement, and the criteria in SI or RRC signaling.

At block 508, the method 500 may perform one of the two-step RACH procedure or the four-step RACH procedure using the allocated resources. In some aspects, the communicating component 342, such as in conjunction with processor(s) 312, memory 316, or transceiver 302, may be configured to perform one of the two-step RACH procedure of the four-step RACH procedure using the allocated resources. Thus, the UE 104, the processor(s) 312, the communicating component 342 or one of its subcomponents may define the means for performing one of the two-step RACH procedure of the four-step RACH procedure using the allocated resources. For example, the processor 312 of the UE 104 may activate the transceiver 302 and associated RF front end 388 components to perform one of the two-step RACH procedure of the four-step RACH procedure using the allocated resources.

In some aspects, the UE may correspond to a first UE capability type different from a second UE capability type having a distinct coverage or latency characteristics, and although not shown, the method 500 may include determining that the allocation of resources is for the two-step RACH procedure, and determining a filtered RSRP measurement satisfies the RSRP threshold value configured for the RSRP measurement object; and selecting the allocation of resources for the two-step RACH procedure corresponding to the UE of a first UE capability type.

Figure 5B:
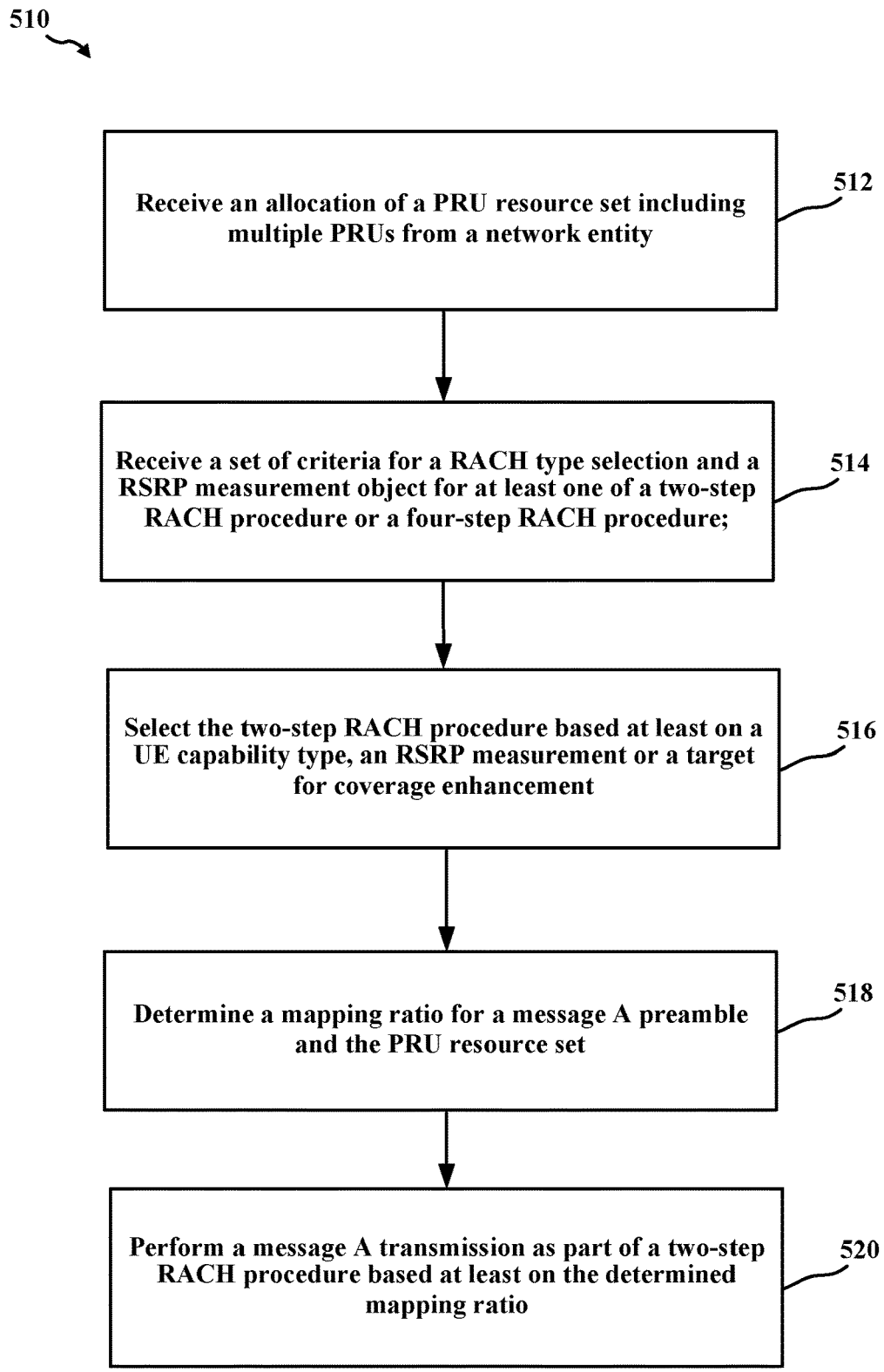
FIG. 5B is a flowchart of another example method of wireless communication at a UE.

FIG. 5B is a flowchart of an example method 510 of wireless communication at an apparatus of a UE. In an example, a UE 104 can perform the functions described in method 510 using one or more of the components described in FIGS. 1, 3 and 7.

At block 512, the method 510 may receive an allocation of a PRU resource set including multiple PRUs from a network entity. In some aspects, the communicating component 342, such as in conjunction with processor(s) 312, memory 316, or transceiver 302, may be configured to receive an allocation of a PRU resource set including multiple PRUs from a network entity. Thus, the UE 104, the processor(s) 312, the communicating component 342 or one of its subcomponents may define the means for receiving an allocation of a PRU resource set including multiple PRUs from a network entity. For example, the processor 312 of the UE 104 may activate the transceiver 302 and associated RF front end 388 components to receive the allocation of the PRU resource set including the multiple PRUs.

In some aspects, the allocation of the PRU resource set may be for a single message A transmission.

In some aspects, the multiple PRUs may be aggregated PUSCH slots with Type A mapping or Type B mapping. For example, for PUSCH repetition Type A, the maximum number of repetitions may be increased up to a defined limit, and the number of repetitions may be counted on the basis of available uplink slots.

In some aspects, the PRU resource set may span multiple slots in a time domain. For transport block processing over a multi-slot PUSCH, the transport block size (TBS) may be determined based on multiple slots and transmitted over multiple slots.

In some aspects, the PRU resource set may be configured with inter-slot frequency hopping or intra-slot frequency hopping. For instance, inter-slot frequency hopping may be supported for repetition of an initial Msg3 PUSCH and re-transmission.

In some aspects, the multiple PRUs may be associated with a number of POs for the message A transmission, and although not shown, the method 510 may further include validating the POs according to at least one of joint validation of the POs associated with the PRU resource set, or separate validation of the POs.

At block 514, the method 510 may receive a set of criteria for a RACH type selection and a RSRP measurement object for at least one of a two-step RACH procedure or a four-step RACH procedure. In some aspects, the communicating component 342, such as in conjunction with processor(s) 312, memory 316, or transceiver 302, may be configured to receive a set of criteria for a RACH type selection and a RSRP measurement object for at least one of a two-step RACH procedure or a four-step RACH procedure. Thus, the UE 104, the processor(s) 312, the communicating component 342 or one of its subcomponents may define the means for receiving a set of criteria for a RACH type selection and a RSRP measurement object for at least one of a two-step RACH procedure or a four-step RACH procedure.

At block 516, the method 510 may select the two-step RACH procedure based at least on a UE capability type, an RSRP measurement or a target for coverage enhancement. In some aspects, the communicating component 342, such as in conjunction with processor(s) 312, memory 316, or transceiver 302, may be configured to select the two-step RACH procedure based at least on a UE capability type, an RSRP measurement or a target for coverage enhancement. Thus, the UE 104, the processor(s) 312, the communicating component 342 or one of its subcomponents may define the means for selecting the two-step RACH procedure based at least on a UE capability type, an RSRP measurement or a target for coverage enhancement.

At block 518, the method 510 may determine a mapping ratio for a message A preamble and the PRU resource set. In some aspects, the communicating component 342, such as in conjunction with processor(s) 312, memory 316, or transceiver 302, may be configured to determine a mapping ratio for a message A preamble and the PRU resource set. Thus, the UE 104, the processor(s) 312, the communicating component 342 or one of its subcomponents may define the means for determining a mapping ratio for a message A preamble and the PRU resource set. For instance, the processor 312 of the UE 104 may, in conjunction with one or more applications 375 residing at the memory 316, may, for the message A preamble and the PRU resource set, determine the mapping ratio.

In some aspects, determining the mapping ratio may include validating the PUSCH occasions within the PRU resource set, where the mapping ratio may be determined for the message A preamble and the validated PRU resource set.

In some aspects, determining the mapping ratio for the message A preamble and the PRU resource set may include receiving one of a system information message or a RRC message including the mapping ratio for a defined message A configuration, and decoding the system information message or the RRC message to obtain the mapping ratio.

In some aspects, determining the mapping ratio for the message A preamble and the PRU resource set may include deriving the mapping ratio based on a function of a number of valid PRACH resources, a number of valid PRU resource sets, and a number of PRUs per PRU resource set.

At block 520, the method 510 may perform a message A transmission as part of a two-step RACH procedure based at least on the determined mapping ratio. In some aspects, the communicating component 342, such as in conjunction with processor(s) 312, memory 316, or transceiver 302, may be configured to perform a message A transmission as part of a two-step RACH procedure based at least on the determined mapping ratio. Thus, the UE 104, the processor(s) 312, the communicating component 342 or one of its subcomponents may define the means for performing a message A transmission as part of a two-step RACH procedure based at least on the determined mapping ratio. For example, in accordance with the mapping ratio between validated PRACH and PUSCH resources, the processor 312 of the UE 104 may activate the transceiver 302 and associated RF front end 388 components to engage in the message A transmission as part of the two-step RACH procedure.

In some aspects, the message A transmission may be performed as part of a two-step RACH procedure based at least on the validated PRU resource set and the determined mapping ratio.

In some aspects, the method 510 may further include a UE receiving an index of a RO having at least one unutilized PRU resource for each PRACH slot within an SSB-to-RO association pattern period or a CSI-RS-to-RO association pattern period, determining whether to perform the two-step RACH procedure or a four-step RACH procedure, and ignoring the at least one unutilized PRU resource based on determining to perform the two-step RACH procedure. In some aspects, the communicating component 342, such as in conjunction with processor(s) 312, memory 316, or transceiver 302, may be configured to receive an index of a RO having at least one unutilized PRU resource for each PRACH slot within an SSB-to-RO association pattern period or a CSI-RS-to-RO association pattern period, determine whether to perform the two-step RACH procedure or a four-step RACH procedure, and ignore the at least one unutilized PRU resource based on determining to perform the two-step RACH procedure. Thus, the UE 104, the processor(s) 312, the communicating component 342 or one of its subcomponents may define the means for receiving an index of a RO having at least one unutilized PRU resource for each PRACH slot within an SSB-to-RO association pattern period or a CSI-RS-to-RO association pattern period, determining whether to perform the two-step RACH procedure or a four-step RACH procedure, and ignoring the at least one unutilized PRU resource based on determining to perform the two-step RACH procedure In some aspects, the method 510 may further include a UE determining that mapping information for the two-step RACH procedure can be decoded, and based on having a valid RO for the two-step RACH procedure and not having a valid PRU resource set for the two-step RACH procedure: transmitting message 1 of the four-step RACH procedure, and monitoring message 2 only within a RAR window starting after a message 1 transmission, or monitoring both message 2 and message B within an extended RAR window after the message 1 transmission. In some aspects, the communicating component 342, such as in conjunction with processor(s) 312, memory 316, or transceiver 302, may be configured to map information for the two-step RACH procedure can be decoded, and based on having a valid RO for the two-step RACH procedure and not having a valid PRU resource set for the two-step RACH procedure: transmit message 1 of the four-step RACH procedure, and monitor message 2 only within a RAR window starting after a message 1 transmission, or monitor both message 2 and message B within an extended RAR window after the message 1 transmission. Thus, the UE 104, the processor(s) 312, the communicating component 342 or one of its subcomponents may define the means for mapping information for the two-step RACH procedure can be decoded, and based on having a valid RO for the two-step RACH procedure and not having a valid PRU resource set for the two-step RACH procedure: transmitting message 1 of the four-step RACH procedure, and monitoring message 2 only within a RAR window starting after a message 1 transmission, or monitoring both message 2 and message B within an extended RAR window after the message 1 transmission In some aspects, a cyclic redundancy check (CRC) of a DCI for the message 2 is masked by a C-RNTI, a TC-RNTI or a RA-RNTI.

In some aspect, a CRC of a DCI for a message B is masked by a C-RNTI or a message B-RNTI, and wherein a length of the extended RAR window is upper bounded by a sum of a message 2 RAR window length and a message B RAR window length.

Figure 5C:
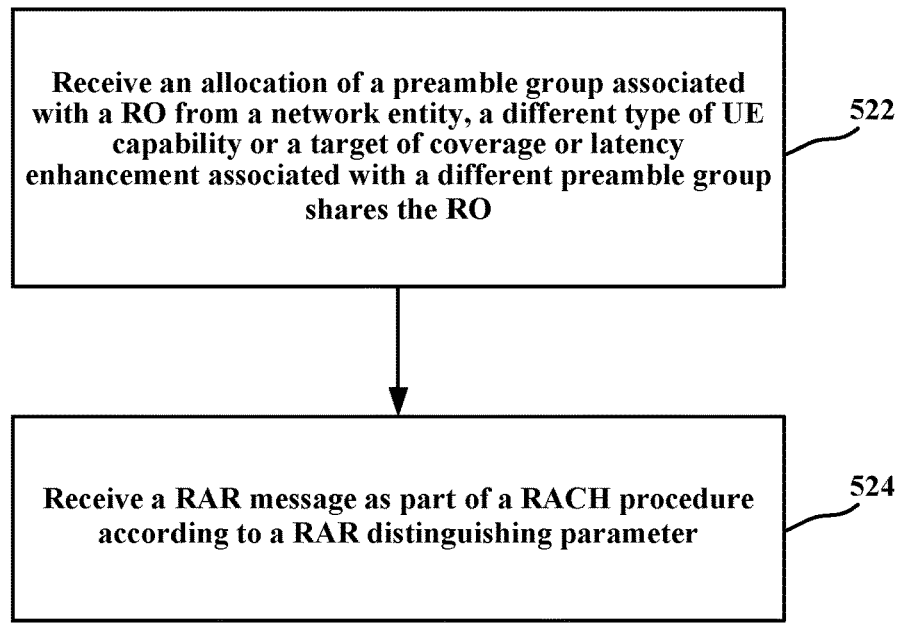
FIG. 5C is a flowchart of a further example method of wireless communication at a UE.

FIG. 5C is a flowchart of an example method 520 of wireless communication at an apparatus of a UE. In an example, a UE 104 can perform the functions described in method 520 using one or more of the components described in FIGS. 1, 3 and 7.

At block 522, the method 520 may receive an allocation of a preamble group associated with a RO from a network entity, a different type of UE capability or a target of coverage/latency enhancement associated with a different preamble group shares the RO. In some aspects, the communicating component 342, such as in conjunction with processor(s) 312, memory 316, or transceiver 302, may be configured to receive an allocation of a preamble group associated with a RO from a network entity, a different type of UE capability or a target of coverage/latency enhancement associated with a different preamble group shares the RO. Thus, the UE 104, the processor(s) 312, the communicating component 342 or one of its subcomponents may define the means for receiving an allocation of a preamble group associated with a RO from a network entity, a different type of UE capability or a target of coverage/latency enhancement associated with a different preamble group shares the RO. For example, the processor 312 of the UE 104 may activate the transceiver 302 and associated RF front end 388 components to receive an allocation of a preamble group representing UEs having different capabilities, coverage and/or latency requirements that share the same RO.

At block 524, the method 520 may receive a RAR message as part of a RACH procedure according to a RAR distinguishing parameter. In some aspects, the communicating component 342, such as in conjunction with processor(s) 312, memory 316, or transceiver 302, may be configured to receive a RAR message as part of a RACH procedure according to a RAR distinguishing parameter. Thus, the UE 104, the processor(s) 312, the communicating component 342 or one of its subcomponents may define the means for receiving a RAR message as part of a RACH procedure according to a RAR distinguishing parameter. For example, the processor 312 of the UE 104 may activate the transceiver 302 and associated RF front end 388 components to receive a RAR message as part of a RACH procedure according to a RAR distinguishing parameter.

In some aspects, the RAR distinguishing parameter may correspond to a different radio network identifier formulation to mask a PDCCH scheduling the RAR.

In some aspects, the RAR distinguishing parameter may correspond to a repurposed reserved bit of DCI.

In some aspects, the RAR distinguishing parameter may correspond to an allocation of different synchronization signal sets.

In some aspects, the RAR distinguishing parameter may correspond to a configuration of different DMRS resources for a PDCCH transmission.

Figure 6A:
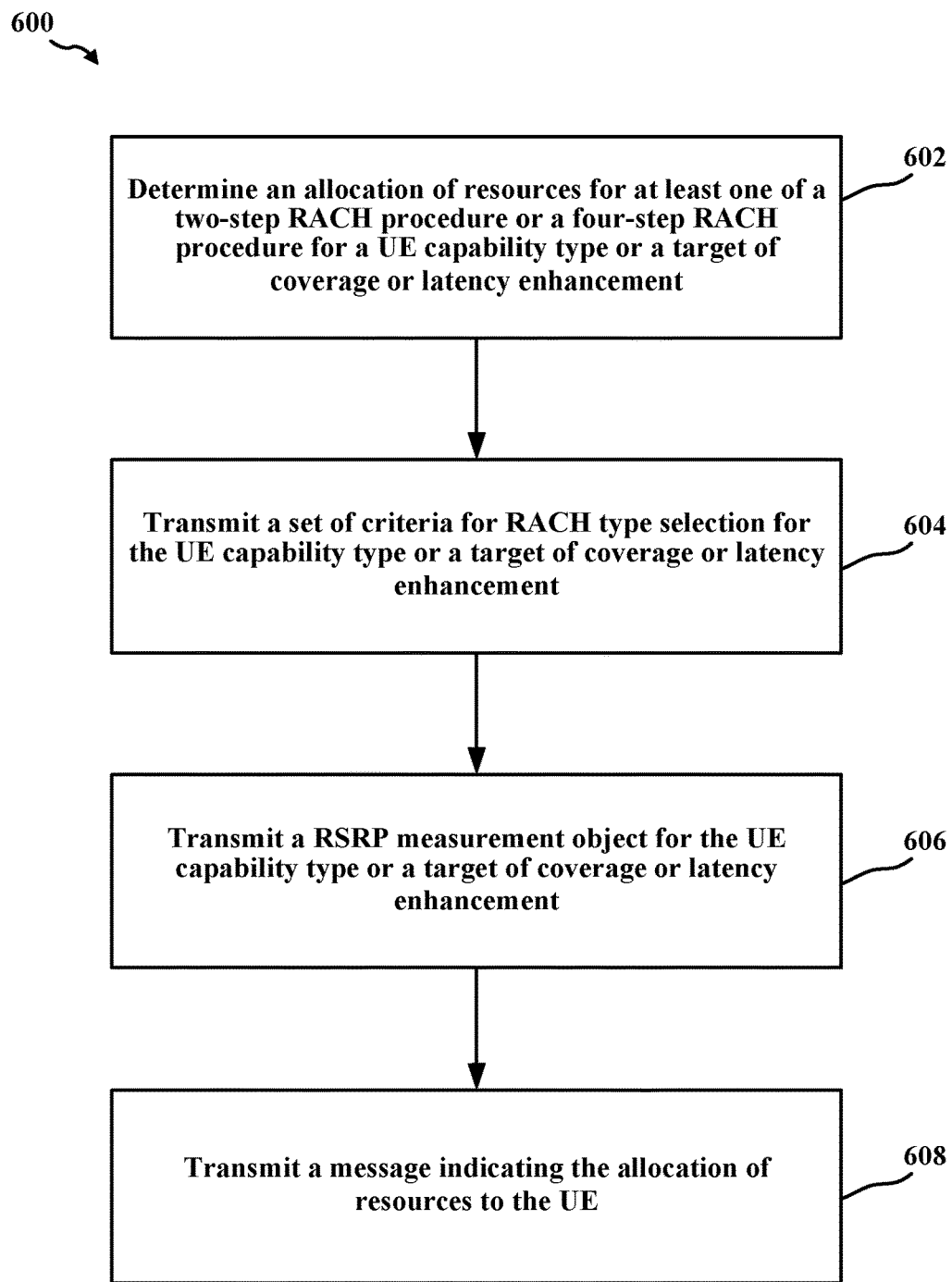
FIG. 6A is a flowchart of an example method of wireless communication at a network entity.

FIG. 6A is a flowchart of another example method 600 for wireless communication at an apparatus of a network entity. In an example, a base station 102 can perform the functions described in method 600 using one or more of the components described in FIGS. 1, 2 and 7.

At block 602, the method 600 may determine an allocation of resources for at least one of a two-step RACH procedure or a four-step RACH procedure for a UE capability type or a target of coverage r latency enhancement. In some aspects, the communicating component 242, such as in conjunction with processor(s) 212, memory 216, or transceiver 202, may be configured to determine an allocation of resources for at least one of a two-step RACH procedure or a four-step RACH procedure for a UE capability type or a target of coverage or latency enhancement. Thus, the base station 102, the processor(s) 212, the communicating component 242 or one of its subcomponents may define the means for determining an allocation of resources for at least one of a two-step RACH procedure or a four-step RACH procedure for a UE capability type or a target of coverage or latency enhancement. For instance, the processor 212 of the base station 102 may, in conjunction with one or more applications 275 residing at the memory 216, may determine an allocation of resources for at least one of a two-step RACH procedure or a four-step RACH procedure for a UE capability type or a target of coverage or latency enhancement, e.g., as indicated by capability registration process.

At block 604, the method 600 may transmit a set of criteria for RACH type selection for the UE capability type or a target of coverage or latency enhancement. In some aspects, the communicating component 242, such as in conjunction with processor(s) 212, memory 216, or transceiver 202, may be configured to transmit a set of criteria for RACH type selection for the UE capability type or a target of coverage or latency enhancement. Thus, the base station 102, the processor(s) 212, the communicating component 42 or one of its subcomponents may define the means for transmitting a set of criteria for RACH type selection for the UE capability type or a target of coverage or latency enhancement. For example, to transmit a set of criteria for RACH type selection for the UE capability type, the processor 212 of the base station 102 may activate the transceiver 202 and associated RF front end 288 components.

In some aspects, the set of criteria for RACH type selection may include at least one of a filtered RSRP measurement, UE capability information, or a result of PRACH or PUSCH resource validation for message A.

At block 606, the method 600 may transmit a RSRP measurement object for the UE capability type or a target of coverage or latency enhancement. In some aspects, the communicating component 242, such as in conjunction with processor(s) 212, memory 216, or transceiver 202, may be configured to transmit a RSRP measurement object for the UE capability type or a target of coverage or latency enhancement. Thus, the base station 102, the processor(s) 212, the communicating component 242 or one of its subcomponents may define the means for transmitting a RSRP measurement object for the UE capability type. For example, to transmit a RSRP measurement object (e.g., measurement object indicates frequency and/or time location, and subcarrier spacing of reference signals to be measured) for the UE capability type or a target of coverage or latency enhancement, the processor 212 of the base station 102 may activate the transceiver 202 and associated RF front end 288 components.

At block 608, the method 600 may transmit a message indicating the allocation of resources to the UE. In some aspects, the communicating component 242, such as in conjunction with processor(s) 212, memory 216, or transceiver 202, may be configured to transmit a message indicating the allocation of resources to the UE. Thus, the base station 102, the processor(s) 212, the communicating component 242 or one of its subcomponents may define the means for transmitting a message indicating the allocation of resources to the UE. For example, to transmit a message indicating the allocation of resources to the UE 104, the processor 212 of the base station 102 may activate the transceiver 202 and associated RF front end 288 components.

In some aspects, the message may correspond to one of a system information message or radio resource control message.

In some aspects, the UE may correspond to a first UE capability type different from a second UE capability type having a distinct coverage or latency characteristic, and although not show, the method 600 may further include configuring a first RSRP measurement object for the first UE capability type and a second RSRP measurement object for the second UE capability type based on determining at least a different RSRP threshold for different UE capability types, and transmitting the first RSRP measurement object to the first UE and the second RSRP object to the UE.

Figure 6B:
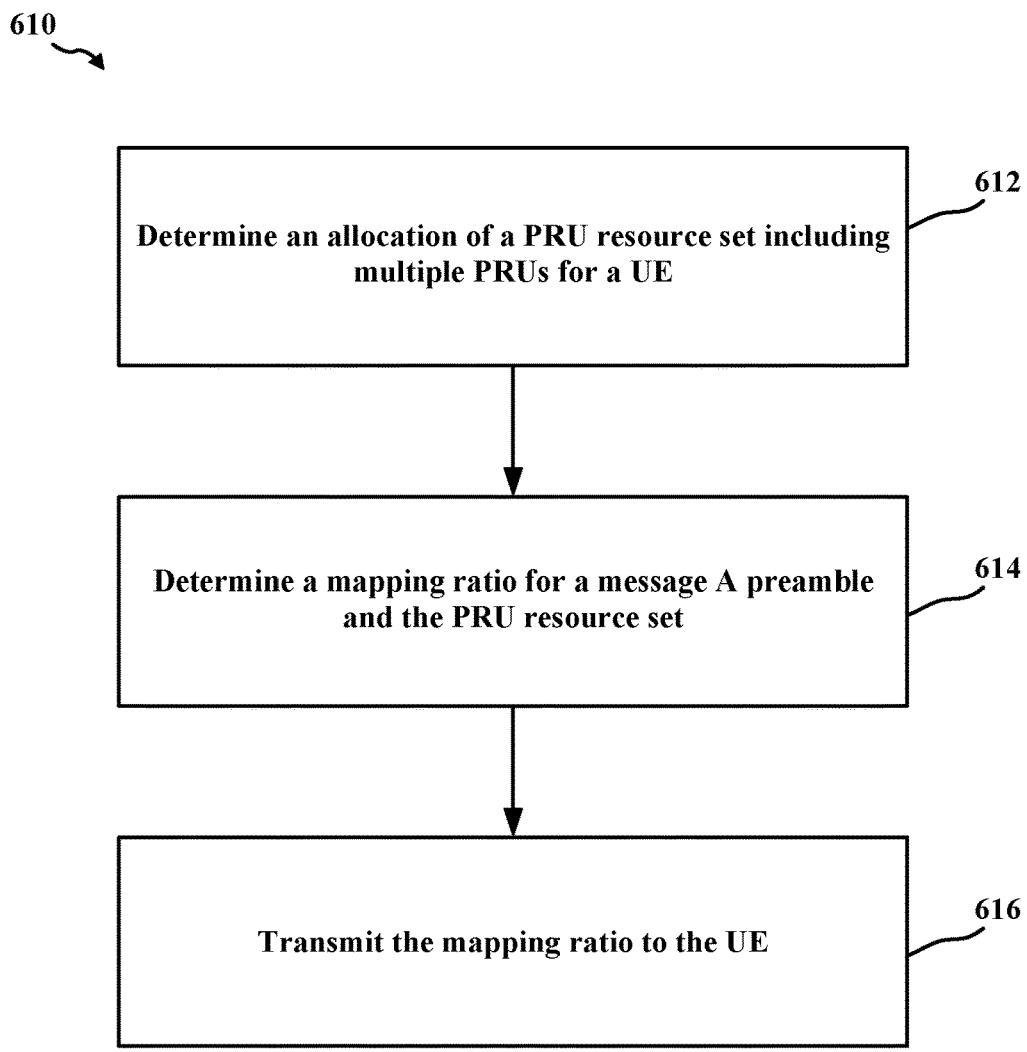
FIG. 6B is a flowchart of another example method of wireless communication at a network entity.

FIG. 6B is a flowchart of another example method 610 for wireless communication at an apparatus of a network entity. In an example, a base station 102 can perform the functions described in method 610 using one or more of the components described in FIGS. 1, 2 and 7.

At block 612, the method 610 may determine an allocation of a PRU resource set including multiple PRUs for a UE. In some aspects, the communicating component 242, such as in conjunction with processor(s) 212, memory 216, or transceiver 202, may be configured to determine an allocation of a PRU resource set including multiple PRUs for a UE. Thus, the base station 102, the processor(s) 212, the communicating component 242 or one of its subcomponents may define the means for determining an allocation of a PRU resource set including multiple PRUs for a UE. For instance, the processor 212 of the base station 102 may, in conjunction with one or more applications 275 residing at the memory 216, may determine an allocation of a PRU resource set including multiple PRUs for a UE 104.

In some aspects, the allocation of the PRU resource set may be for a single message A transmission.

In some aspects, the multiple PRUs may be aggregated PUSCH slots with Type A mapping or Type B mapping.

In some aspects, the PRU resource set may span multiple slots in a time domain.

In some aspects, the PRU resource set may be configured with inter-slot frequency hopping or intra-slot frequency hopping.

At block 614, the method 610 may determine a mapping ratio for a message A preamble and the PRU resource set. In some aspects, the communicating component 242, such as in conjunction with processor(s) 212, memory 216, or transceiver 202, may be configured to determine a mapping ratio for a message A preamble and the PRU resource set. Thus, the base station 102, the processor(s) 212, the communicating component 242 or one of its subcomponents may define the means for determining a mapping ratio for a message A preamble and the PRU resource set. For instance, the processor 212 of the base station 102 may, in conjunction with one or more applications 275 residing at the memory 216, may determine a mapping ratio between validated PRACH and PUSCH resources for a message A preamble and the PRU resource set.

At block 616, the method 610 may determine an allocation of a PRU resource set including multiple PRUs for a UE. In some aspects, the communicating component 242, such as in conjunction with processor(s) 212, memory 216, or transceiver 202, may be configured to determine an allocation of a PRU resource set including multiple PRUs for a UE. Thus, the base station 102, the processor(s) 212, the communicating component 242 or one of its subcomponents may define the means for determining an allocation of a PRU resource set including multiple PRUs for a UE. For instance, the processor 212 of the base station 102 may, in conjunction with one or more applications 275 residing at the memory 216, may determine an allocation of a PRU resource set including multiple PRUs for a UE 104.

Figure 6C:
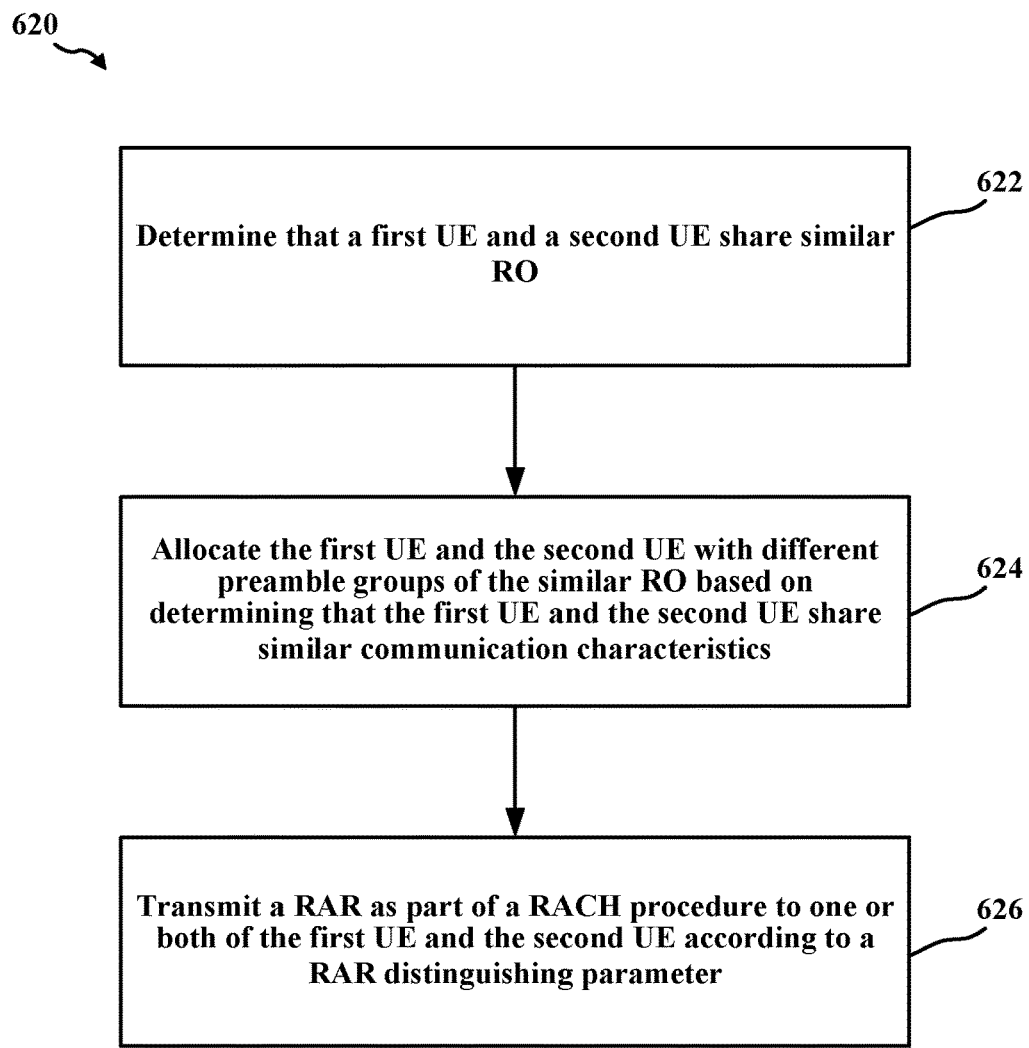
FIG. 6C is a flowchart of a further example method of wireless communication at a network entity.

FIG. 6C is a flowchart of another example method 620 for wireless communication at an apparatus of a network entity. In an example, a base station 102 can perform the functions described in method 620 using one or more of the components described in FIGS. 1, 2 and 7.

At block 622, the method 620 may determine that a first UE and a second UE share similar RO. In some aspects, the communicating component 242, such as in conjunction with processor(s) 212, memory 216, or transceiver 202, may be configured to determine that a first UE and a second UE share similar RO. Thus, the base station 102, the processor(s) 212, the communicating component 242 or one of its subcomponents may define the means for determining that a first UE and a second UE share similar RO. For instance, the processor 212 of the base station 102 may, in conjunction with one or more applications 275 residing at the memory 216, may determine that a first UE and a second UE share similar RO representing UEs having different capabilities, coverage and/or latency requirements that share the same RO.

At block 624, the method 620 may allocate the first UE and the second UE with different preamble groups of the similar RO based on determining that the first UE and the second UE share similar RO. In some aspects, the communicating component 242, such as in conjunction with processor(s) 212, memory 216, or transceiver 202, may be configured to allocate the first UE and the second UE with different preamble groups of the similar RO based on determining that the first UE and the second UE share similar RO. Thus, the base station 102, the processor(s) 212, the communicating component 242 or one of its subcomponents may define the means for allocating the first UE and the second UE with different preamble groups of the similar RO based on determining that the first UE and the second UE share similar RO. For instance, the processor 212 of the base station 102 may, in conjunction with one or more applications 275 residing at the memory 216, may allocate the first UE and the second UE with different preamble groups of the similar RO.

At block 626, the method 620 may transmit a RAR as part of a RACH procedure to one or both of the first UE and the second UE according to a RAR distinguishing parameter. In some aspects, the communicating component 242, such as in conjunction with processor(s) 212, memory 216, or transceiver 202, may be configured to transmit a RAR as part of a RACH procedure to one or both of the first UE and the second UE according to a RAR distinguishing parameter. Thus, the base station 102, the processor(s) 212, the communicating component 242 or one of its subcomponents may define the means for transmitting a RAR as part of a RACH procedure to one or both of the first UE and the second UE according to a RAR distinguishing parameter. For example, to transmit a RAR as part of a RACH procedure to one or both of the first UE and the second UE according to a RAR distinguishing parameter, the processor 212 of the base station 102 may activate the transceiver 202 and associated RF front end 288 components.

In some aspects, the RAR distinguishing parameter may correspond to a different radio network identifier formulation to mask a PDCCH scheduling the RAR.

In some aspects, the RAR distinguishing parameter may correspond to a repurposed reserved bit of DCI.

In some aspects, the RAR distinguishing parameter may correspond to an allocation of different synchronization signal sets.

In some aspects, the RAR distinguishing parameter may correspond to a configuration of different DMRS resources for a PDCCH transmission.

Figure 7:
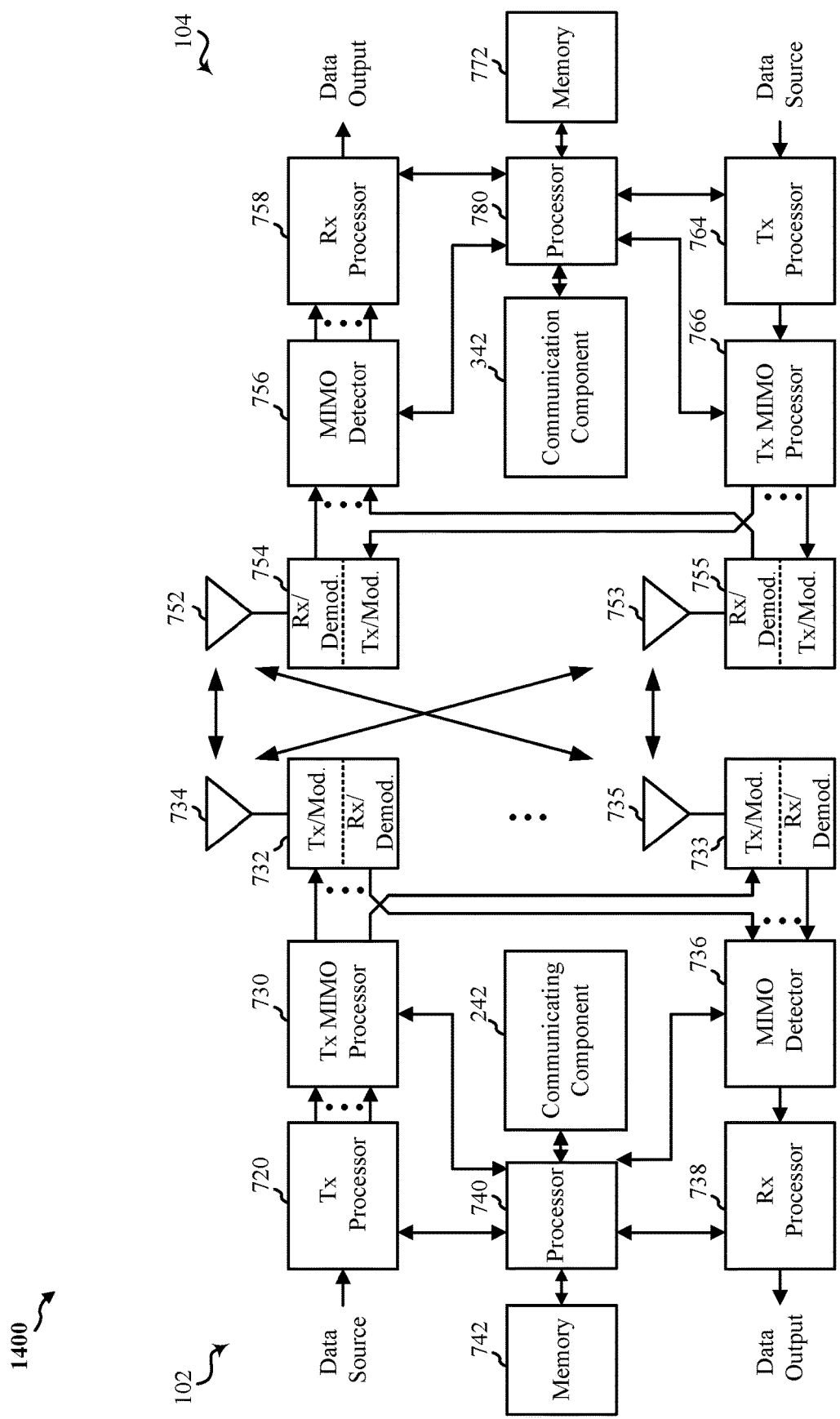
FIG. 7 is a block diagram illustrating an example of a MIMO communication system including a base station and a UE.

FIG. 7 is a block diagram of a MIMO communication system 700 including a base station 102 and a UE 104. The MIMO communication system 700 may be configured to perform RACH type selections, determine mapping ratios, perform mapping procedures for orphan PRACH resources, and facilitate RAR type differentiation, as described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (such as FIGS. 1 and 2). The processor 740 may in some cases execute stored instructions to instantiate a communicating component 342 (such as FIGS. 1 and 3).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The aspects described herein additionally include one or more of the following aspect examples described in the following numbered clauses.

1. A method of communications at a user equipment (UE) for coverage enhancement, comprising:
   receiving an allocation of a physical uplink shared channel (PUSCH) resource unit (PRU) resource set including multiple PRUs from a network entity;
   receiving a set of criteria for a random access channel (RACH) type selection and a reference signal received power (RSRP) measurement object for at least one of a two-step RACH procedure or a four-step RACH procedure;
   selecting the two-step RACH procedure based at least on a UE capability type, an RSRP measurement or a target for coverage enhancement
   determining a mapping ratio for a message A preamble and the PRU resource set; and
   performing a message A transmission as part of a two-step random access channel (RACH) procedure based at least on the determined mapping ratio.

2. The method of clause 1, wherein the allocation of the PRU resource set is for a single message A transmission.

3. The method of any preceding clause, wherein the multiple PRUs are aggregated PUSCH slots with Type A mapping or Type B mapping.

4. The method of any preceding clause, wherein the PRU resource set spans multiple slots in a time domain.

5. The method of any preceding clause, wherein the PRU resource set is configured with inter-slot frequency hopping or intra-slot frequency hopping.

6. The method of any preceding clause, wherein the multiple PRUs are associated with a number of PUSCH occasions (POs) for the message A transmission, the method further comprising validating the POs according to at least one of:
   joint validation of the POs associated with the PRU resource set, or
   separate validation of the POs.

7. The method of any preceding clause, wherein determining the mapping ratio for the message A preamble and the PRU resource set includes:
   receiving one of a system information message or a radio resource control (RRC) message including the mapping ratio for a defined message A configuration; and
   decoding the system information message or the RRC message to obtain the mapping ratio.

8. The method of any preceding clause, wherein determining the mapping ratio for the message A preamble and the PRU resource set includes:
   deriving the mapping ratio based on a function of a number of valid physical RACH (PRACH) resources, a number of valid PRU resource sets, and a number of PRUs per PRU resource set.

9. The method of any preceding clause, further comprising:
   receiving an index of a RACH occasion (RO) having at least one unutilized PRU resource for each physical RACH (PRACH) slot within an synchronization signal block (SSB)-to-RO association pattern period or a channel state indication reference signal (CSI-RS)-to-RO association pattern period;
   determining whether to perform the two-step RACH procedure or a four-step RACH procedure; and
   ignoring the at least one unutilized PRU resource based on determining to perform the two-step RACH procedure.

10. The method of any preceding clause, further comprising:
    determining that mapping information for the two-step RACH procedure can be decoded; and
    based on having a valid RACH occasion (RO) for the two-step RACH procedure and not having a valid PRU resource set for the two-step RACH procedure:
    transmitting message 1 of the four-step RACH procedure; and
    monitoring message 2 only within a random access response (RAR) window starting after a message 1 transmission, or
    monitoring both message 2 and message B within an extended RAR window after the message 1 transmission.

11. The method of any preceding clause, wherein a cyclic redundancy check (CRC) of a downlink control information (DCI) for the message 2 is masked by a cell radio network identifier (C-RNTI), a temporary cell RNTI (TC-RNTI) or a random access RNTI (RA-RNTI).

12. The method of any preceding clause, wherein a cyclic redundancy check (CRC) of a downlink control information (DCI) for a message B is masked by a cell radio network identifier (C-RNTI) or a message B-RNTI, and wherein a length of the extended RAR window is upper bounded by a sum of a message 2 RAR window length and a message B RAR window length.

13. An apparatus for coverage enhancement, comprising:
    a transceiver;

a memory configured to store instructions; and at least one processor communicatively coupled with the transceiver and the memory, wherein the at least one processor is configured to:

receive an allocation of a physical uplink shared channel (PUSCH) resource unit (PRU) resource set including multiple PRUs from a network entity;

receive a set of criteria for a random access channel (RACH) type selection and a reference signal received power (RSRP) measurement object for at least one of a two-step RACH procedure or a four-step RACH procedure;

select the two-step RACH procedure based at least on a UE capability type, an RSRP measurement or a target for coverage enhancement determine a mapping ratio for a message A preamble and the PRU resource set; and perform a message A transmission as part of a two-step random access channel (RACH) procedure based at least on the determined mapping ratio.

14. The apparatus of clause 13, wherein the allocation of the PRU resource set is for a single message A transmission.

15. The apparatus of any preceding clause, wherein the multiple PRUs are aggregated PUSCH slots with Type A mapping or Type B mapping.

16. The apparatus of any preceding clause, wherein the PRU resource set spans multiple slots in a time domain.

17. The apparatus of any preceding clause, wherein the PRU resource set is configured with inter-slot frequency hopping or intra-slot frequency hopping.

18. The apparatus of any preceding clause, wherein the multiple PRUs are associated with a number of PUSCH occasions (POs) for the message A transmission, and wherein the at least one processor is further configured to validate the POs according to at least one of:

joint validation of the POs associated with the PRU resource set, or separate validation of the POs.

19. The apparatus of any preceding clause, wherein to determine the mapping ratio for the message A preamble and the PRU resource set, the at least one processor is further configured to:

receive one of a system information message or a radio resource control (RRC) message including the mapping ratio for a defined message A configuration; and decode the system information message or the RRC message to obtain the mapping ratio.

20. The apparatus of any preceding clause, wherein to determine the mapping ratio for the message A preamble and the PRU resource set, the at least one processor is further configured to:

derive the mapping ratio based on a function of a number of valid physical RACH (PRACH) resources, a number of valid PRU resource sets, and a number of PRUs per PRU resource set.

21. The apparatus of any preceding clause, wherein the at least one processor is further configured to:

receive an index of a RACH occasion (RO) having at least one unutilized PRU resource for each physical RACH (PRACH) slot within an synchronization signal block (SSB)-to-RO association pattern period or a channel state indication reference signal (CSI-RS)-to-RO association pattern period;

determine whether to perform the two-step RACH procedure or a four-step RACH procedure; and ignore the at least one unutilized PRU resource based on determining to perform the two-step RACH procedure.

22. The apparatus of any preceding clause, wherein the at least one processor is further configured to:

determine that mapping information for the two-step RACH procedure can be decoded; and based on having a valid RACH occasion (RO) for the two-step RACH procedure and not having a valid PRU resource set for the two-step RACH procedure:

transmit message 1 of the four-step RACH procedure; and monitor message 2 only within a random access response (RAR) window starting after a message 1 transmission, or monitor both message 2 and message B within an extended RAR window after the message 1 transmission.

23. The apparatus of any preceding clause, wherein a cyclic redundancy check (CRC) of a downlink control information (DCI) for the message 2 is masked by a cell radio network identifier (C-RNTI), a temporary cell RNTI (TC-RNTI) or a random access RNTI (RA-RNTI).

24. The apparatus of any preceding clause, wherein a cyclic redundancy check (CRC) of a downlink control information (DCI) for a message B is masked by a cell radio network identifier (C-RNTI) or a message B-RNTI, and wherein a length of the extended RAR window is upper bounded by a sum of a message 2 RAR window length and a message B RAR window length.

25. An apparatus for coverage enhancement, comprising:

means for receiving an allocation of a physical uplink shared channel (PUSCH) resource unit (PRU) resource set including multiple PRUs from a network entity;

means for receiving a set of criteria for a random access channel (RACH) type selection and a reference signal received power (RSRP) measurement object for at least one of a two-step RACH procedure or a four-step RACH procedure;

means for selecting the two-step RACH procedure based at least on a UE capability type, an RSRP measurement or a target for coverage enhancement means for determining a mapping ratio for a message A preamble and the PRU resource set; and means for performing a message A transmission as part of a two-step random access channel (RACH) procedure based at least on the determined mapping ratio.

26. The apparatus of clause 25, wherein the multiple PRUs are aggregated PUSCH slots with Type A mapping or Type B mapping.

27. The apparatus of any preceding clause, wherein the PRU resource set spans multiple slots in a time domain, and wherein the PRU resource set is configured with inter-slot frequency hopping or intra-slot frequency hopping.

28. A non-transitory computer-readable medium including stored instructions for coverage enhancement, executable by a processor to:

receive an allocation of a physical uplink shared channel (PUSCH) resource unit (PRU) resource set including multiple PRUs from a network entity;

receive a set of criteria for a random access channel (RACH) type selection and a reference signal received power (RSRP) measurement object for at least one of a two-step RACH procedure or a four-step RACH procedure;

select the two-step RACH procedure based at least on a UE capability type, an RSRP measurement or a target for coverage enhancement determine a mapping ratio for a message A preamble and the PRU resource set; and perform a message A transmission as part of a two-step random access channel (RACH) procedure based at least on the determined mapping ratio.

29. The non-transitory computer-readable medium of clause 28, wherein the multiple PRUs are aggregated PUSCH slots with Type A mapping or Type B mapping.

30. The non-transitory computer-readable medium of any preceding clause, wherein the PRU resource set spans multiple slots in a time domain, and wherein the PRU resource set is configured with inter-slot frequency hopping or intra-slot frequency hopping.

31. A method of communications at a user equipment (UE), comprising:

receiving an allocation of resources, a set of criteria for a random access channel (RACH) type selection, and a reference signal received power (RSRP) measurement object for at least one of a two-step RACH procedure or a four-step RACH procedure from a network entity;

performing an RSRP measurement according to the RSRP measurement object;

performing the RACH type selection based on the set of criteria indicated by the network entity in system information (SI) or radio resource control (RRC) signaling; and performing one of the two-step RACH procedure of the four-step RACH procedure using the allocated resources based on the RACH type selection.

32. The method of clause 31, wherein the criteria for RACH type selection include at least one of:

a filtered reference signal received power (RSRP) measurement, a result of physical RACH (PRACH) or physical uplink shared channel (PUSCH) resource validation for message A.

33. The method of clause 32, wherein the RSRP measurement object includes at least one of:

a time and frequency resource allocation for a reference signal, a periodicity of the reference signal, a filtering parameter of the RSRP measurement, or a threshold of the filtered RSRP measurement.

34. The method of any preceding clause, wherein the UE corresponds to a first UE capability type different from a second UE capability type having a distinct coverage or latency characteristics, further comprising:

determining that the allocation of resources is for the two-step RACH procedure; and determining a filtered RSRP measurement satisfies the reference signal received power (RSRP) threshold value configured for the RSRP measurement object; and selecting the allocation of resources for the two-step RACH procedure corresponding to the UE of a first UE capability type.

35. A method of communications at a network entity, comprising:

determining an allocation of resources for at least one of a two-step random access channel (RACH) procedure or a four-step RACH procedure for a UE capability type;

transmitting a set of criteria for RACH type selection for the UE capability type;

transmitting a reference signal received power (RSRP) measurement object for the UE capability type; and transmitting a message indicating the allocation of resources to the UE.

36. The method of clause 35, wherein the set of criteria for RACH type selection includes at least one of:

a filtered reference signal received power (RSRP) measurement,

UE capability information, or a result of physical RACH (PRACH) or physical uplink shared channel (PUSCH) resource validation for message A.

37. The method of any preceding clause, the UE corresponds to a first UE capability type different from a second UE capability type having a distinct coverage or latency characteristic, further comprising:

configuring a first RSRP measurement object for the first UE capability type and a second RSRP measurement object for the second UE capability type based on determining at least a different RSRP threshold for different UE capability types; and transmitting the first RSRP measurement object to the first UE and the second RSRP object to the UE.

38. The method of any preceding clause, wherein the message corresponds to one of a system information message or radio resource control message.

39. A method of communications at a network entity, comprising:

determining an allocation of a physical uplink shared channel (PUSCH) resource unit (PRU) resource set including multiple PRUs for a user equipment (UE);

determining a mapping ratio for a message A preamble and the PRU resource set; and transmitting the mapping ratio to the UE.

40. The method of clause 39, wherein the allocation of the PRU resource set is for a single message A transmission.

41. The method of any preceding clause, wherein the multiple PRUs are aggregated PUSCH slots with Type A mapping or Type B mapping.

42. The method of any preceding clause, wherein the PRU resource set spans multiple slots in a time domain.

43. The method of any preceding clause, wherein the PRU resource set is configured with inter-slot frequency hopping or intra-slot frequency hopping.

44. A method of communications at a user equipment (UE), comprising:

receiving an allocation of a preamble group associated with a random access channel (RACH) occasion (RO) from a network entity, wherein a different UE associated with a different preamble group shares the RO; and receiving a random access response (RAR) message as part of a RACH procedure according to a RAR distinguishing parameter.

45. The method of clause 44, wherein the RAR distinguishing parameter corresponds to a different radio network identifier formulation to mask a physical downlink control channel (PDCCH) scheduling the RAR.

46. The method of any preceding clause, wherein the RAR distinguishing parameter corresponds to a repurposed reserved bit of downlink control information (DCI).

47. The method of any preceding clause, wherein the RAR distinguishing parameter corresponds to an allocation of different synchronization signal sets.

48. The method of any preceding clause, wherein the RAR distinguishing parameter corresponds to a configuration of different demodulation reference signal (DMRS) resources for a physical downlink control channel (PDCCH) transmission.

49. A method of communications at a network entity, comprising:

determining that a first user equipment (UE) and a second UE share similar random access channel (RACH) occasion (RO);

allocating the first UE and the second UE with different preamble groups of the similar RO based on determining that the first UE and the second UE share similar communication characteristics; and transmitting a random access response (RAR) as part of a RACH procedure to one or both of the first UE and the second UE according to a RAR distinguishing parameter.

50. The method of clause 49, wherein the RAR distinguishing parameter corresponds to a different radio network identifier formulation to mask a physical downlink control channel (PDCCH) scheduling the RAR.

51. The method of any preceding clause, wherein the RAR distinguishing parameter corresponds to a repurposed reserved bit of downlink control information (DCI).

52. The method of any preceding clause, wherein the RAR distinguishing parameter corresponds to an allocation of different synchronization signal sets.

53. The method of any preceding clause, wherein the RAR distinguishing parameter corresponds to a configuration of different demodulation reference signal (DMRS) resources for a physical downlink control channel (PDCCH) transmission.

In a further example, an apparatus for wireless communication is provided that includes a transceiver, a memory configured to store instructions, and one or more processors communicatively coupled with the transceiver and the memory. The one or more processors are configured to execute the instructions to perform the operations of the methods described herein. In another aspect, an apparatus for wireless communication is provided that includes means for performing the operations of methods described herein. In yet another aspect, a non-transitory computer-readable medium is provided including code executable by one or more processors to perform the operations of the methods described herein. The apparatus may be a UE or a network entity.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication, comprising:
a transceiver;
one or more memories configured to, individually or in combination, store instructions; and
one or more processors communicatively coupled with the one or more memories, wherein the one or more processors are, individually or in combination, configured to execute the instructions to cause the apparatus to:
receive, from a network entity, an allocation of a physical uplink shared channel (PUSCH) resource unit (PRU) resource set including multiple PRUs;
receive at least one criteria for a random access channel (RACH) type selection and a reference signal received power (RSRP) measurement object for at least one of a two-step RACH procedure or a four-step RACH procedure;
transmit, based at least on the at least one criteria corresponding to a UE capability type of the apparatus and based on having a valid RACH occasion (RO) for the two-step RACH procedure and not having a valid PRU resource set of the two-step RACH procedure, a RACH preamble during the valid RO;
monitor for a message B within a random access response (RAR) window starting after transmission of the RACH preamble; and
receive the message B within the RAR window, wherein the message B includes a fallback RAR, and wherein a cyclic redundancy check (CRC) of a downlink control information (DCI) for the message B is masked by a message B-RNTI.

2. The apparatus of claim 1, wherein the UE capability type corresponds to a reduced capability UE.

3. The apparatus of claim 1, wherein the one or more processors are, individually or in combination, configured to execute the instructions to cause the apparatus to determine a mapping ratio for at least the RACH preamble, which is associated with a message A transmission, based on one or more ROs and the PRU resource set.

4. The apparatus of claim 3, wherein the one or more processors are, individually or in combination, configured to execute the instructions to cause the apparatus to receive an index of a RO having at least one unutilized PRU resource for each physical RACH (PRACH) slot within a synchronization signal block (SSB)-to-RO association pattern period, wherein the one or more processors are, individually or in combination, configured to execute the instructions to cause the apparatus to determine the mapping ratio based on ignoring the RO having the at least one unutilized PRU resource.

5. The apparatus of claim 3, wherein the multiple PRUs are associated with a number of PUSCH occasions (POs) for message A transmission, and wherein the one or more processors are, individually or in combination, configured to execute the instructions to cause the apparatus to determine the mapping ratio at least in part by validating the POs for the message A transmission.

6. The apparatus of claim 1, wherein a length of the RAR window is upper bounded by a sum of a message 2 RAR window length and a message B RAR window length.

7. The apparatus of claim 1, wherein the one or more processors are, individually or in combination, configured to execute the instructions to cause the apparatus to receive the at least one criteria in radio resource control (RRC) signaling.

8. The apparatus of claim 1, wherein the one or more processors are, individually or in combination, configured to execute the instructions to cause the apparatus to transmit the RACH preamble further based at least on comparing the RSRP measurement object to a threshold, wherein the threshold is configured for the UE capability type.

9. A method for wireless communication at a user equipment (UE), comprising:
receiving, from a network entity, an allocation of a physical uplink shared channel (PUSCH) resource unit (PRU) resource set including multiple PRUs;
receiving at least one criteria for a random access channel (RACH) type selection and a reference signal received power (RSRP) measurement object for at least one of a two-step RACH procedure or a four-step RACH procedure;
transmitting, based at least on the at least one criteria corresponding to a UE capability type of the UE and based on having a valid RACH occasion (RO) for the two-step RACH procedure and not having a valid PRU resource set of the two-step RACH procedure, a RACH preamble during the valid RO;
monitoring for a message B within a random access response (RAR) window starting after transmission of the RACH preamble; and
receiving the message B within the RAR window, wherein the message B includes a fallback RAR, and wherein a cyclic redundancy check (CRC) of a downlink control information (DCI) for the message B is masked by a message B-RNTI.

10. The method of claim 9, wherein the UE capability type corresponds to a reduced capability UE.

11. The method of claim 9, further comprising determining a mapping ratio for at least the RACH preamble, which is associated with a message A transmission, based on one or more ROs and the PRU resource set.

12. The method of claim 11, further comprising receiving an index of a RO having at least one unutilized PRU resource for each physical RACH (PRACH) slot within a synchronization signal block (SSB)-to-RO association pattern period, wherein determining the mapping ratio is based on ignoring the RO having the at least one unutilized PRU resource.

13. The method of claim 11, wherein the multiple PRUs are associated with a number of PUSCH occasions (POs) for message A transmission, and wherein determining the mapping ratio includes validating the POs for the message A transmission.

14. The method of claim 9, wherein a length of the RAR window is upper bounded by a sum of a message 2 RAR window length and a message B RAR window length.

15. The method of claim 9, wherein receiving the at least one criteria includes receiving the at least one criteria in radio resource control (RRC) signaling.

16. An apparatus for wireless communication, comprising:
- means for receiving, from a network entity, an allocation of a physical uplink shared channel (PUSCH) resource unit (PRU) resource set including multiple PRUs;
- means for receiving at least one criteria for a random access channel (RACH) type selection and a reference signal received power (RSRP) measurement object for at least one of a two-step RACH procedure or a four-step RACH procedure;
- means for transmitting, based at least on the at least one criteria corresponding to a UE capability type of the UE and based on having a valid RACH occasion (RO) for the two-step RACH procedure and not having a valid PRU resource set of the two-step RACH procedure, a RACH preamble during the valid RO;
- means for monitoring for a message B within a random access response (RAR) window starting after transmission of the RACH preamble; and
- means for receiving the message B within the RAR window, wherein the message B includes a fallback RAR, and wherein a cyclic redundancy check (CRC) of a downlink control information (DCI) for the message B is masked by a message B-RNTI.

* * * * *